United States Patent
Raman et al.

(10) Patent No.: US 11,388,139 B2
(45) Date of Patent: *Jul. 12, 2022

(54) MIGRATING FIREWALL CONNECTION STATE FOR A FIREWALL SERVICE VIRTUAL MACHINE

(71) Applicant: Nicira, Inc., Palo Alto, CA (US)

(72) Inventors: Chidambareswaran Raman, Sunnyvale, CA (US); Subrahmanyam Manuguri, San Jose, CA (US); Todd Sabin, Morganville, NJ (US)

(73) Assignee: NICIRA, INC., Palo Alto, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/945,748

(22) Filed: Jul. 31, 2020

(65) Prior Publication Data

US 2020/0366645 A1 Nov. 19, 2020

Related U.S. Application Data

(63) Continuation of application No. 15/899,329, filed on Feb. 19, 2018, now Pat. No. 10,735,376, which is a
(Continued)

(51) Int. Cl.
*H04L 29/06* (2006.01)
*G06F 9/455* (2018.01)
*H04L 9/40* (2022.01)

(52) U.S. Cl.
CPC ...... *H04L 63/0227* (2013.01); *G06F 9/45558* (2013.01); *G06F 2009/45595* (2013.01); *H04L 63/0236* (2013.01); *H04L 63/0263* (2013.01)

(58) Field of Classification Search
CPC ............ H04L 63/0227; H04L 63/0236; H04L 63/0263; H04L 29/06; G06F 9/45558; G06F 2009/45595; G06F 9/455
See application file for complete search history.

(56) References Cited

U.S. PATENT DOCUMENTS 6,496,935 B1 12/2002 Fink et al.
6,880,089 B1 4/2005 Bommareddy et al.
(Continued)

FOREIGN PATENT DOCUMENTS

EP 2748750 A1 7/2014
EP 2748978 A1 7/2014
(Continued)

OTHER PUBLICATIONS

Author Unknown, "Cisco Identity-Based Firewall Security," Month Unknown 2011, 2 pages, Cisco Systems, Inc.
(Continued)

*Primary Examiner* — Quazi Farooqui
(74) *Attorney, Agent, or Firm* — Adeli LLP

(57) ABSTRACT

For a host that executes one or more guest virtual machines (GVMs), some embodiments provide a novel virtualization architecture for utilizing a firewall service virtual machine (SVM) on the host to check the packets sent by and/or received for the GVMs. In some embodiments, the GVMs connect to a software forwarding element (e.g., a software switch) that executes on the host to connect to each other and to other devices operating outside of the host. Instead of connecting the firewall SVM to the host's software forwarding element that connects its GVMs, the virtualization architecture of some embodiments provides an SVM interface (SVMI) through which the firewall SVM can be accessed to check the packets sent by and/or received for the GVMs.

21 Claims, 21 Drawing Sheets

Related U.S. Application Data continuation of application No. 14/231,646, filed on Mar. 31, 2014, now Pat. No. 9,906,494.

(56) References Cited

U.S. PATENT DOCUMENTS

| | | | |
|---|---|---|---|
| 7,055,173 | B1 | 5/2006 | Chaganty et al. |
| 7,203,944 | B1 | 4/2007 | Rietschote et al. |
| 7,349,382 | B2 | 3/2008 | Marimuthu et al. |
| 7,730,486 | B2 | 6/2010 | Herington |
| 7,818,452 | B2 | 10/2010 | Matthews et al. |
| 7,948,986 | B1 | 5/2011 | Ghosh et al. |
| 8,032,933 | B2 | 10/2011 | Turley et al. |
| 8,190,767 | B1 | 5/2012 | Maufer et al. |
| 8,365,294 | B2 | 1/2013 | Ross |
| 8,473,557 | B2 | 6/2013 | Ramakrishnan et al. |
| 8,660,129 | B1 | 2/2014 | Brendel et al. |
| 8,799,900 | B1 | 8/2014 | Kodorkin et al. |
| 8,819,678 | B2 | 8/2014 | Tsirkin |
| 9,015,823 | B2 | 4/2015 | Koponen et al. |
| 9,215,210 | B2 | 12/2015 | Raman et al. |
| 9,448,821 | B2 | 9/2016 | Wang |
| 9,503,427 | B2 | 11/2016 | Raman et al. |
| 9,772,866 | B1 | 9/2017 | Aron et al. |
| 9,906,494 | B2 | 2/2018 | Raman et al. |
| 2003/0093481 | A1 | 5/2003 | Mitchell et al. |
| 2004/0049701 | A1 | 3/2004 | Pennec et al. |
| 2005/0081212 | A1 | 4/2005 | Goud et al. |
| 2005/0182853 | A1 | 8/2005 | Lewites et al. |
| 2005/0198125 | A1 | 9/2005 | Beck et al. |
| 2007/0061492 | A1 | 3/2007 | Riel |
| 2008/0072305 | A1 | 3/2008 | Casado et al. |
| 2008/0163207 | A1 | 7/2008 | Reumann et al. |
| 2008/0205377 | A1 | 8/2008 | Chao et al. |
| 2008/0267177 | A1 | 10/2008 | Johnson et al. |
| 2008/0289028 | A1 | 11/2008 | Jansen et al. |
| 2008/0298274 | A1 | 12/2008 | Takashige et al. |
| 2009/0007251 | A1 | 1/2009 | Abzarian et al. |
| 2009/0063750 | A1 | 3/2009 | Dow |
| 2009/0129271 | A1 | 5/2009 | Ramankutty et al. |
| 2009/0150521 | A1 | 6/2009 | Tripathi |
| 2009/0150527 | A1 | 6/2009 | Tripathi et al. |
| 2009/0199177 | A1 | 8/2009 | Edwards et al. |
| 2009/0235325 | A1 | 9/2009 | Dimitrakos et al. |
| 2009/0249470 | A1 | 10/2009 | Litvin et al. |
| 2009/0249472 | A1 | 10/2009 | Litvin et al. |
| 2009/0296726 | A1 | 12/2009 | Snively et al. |
| 2009/0327781 | A1 | 12/2009 | Tripathi |
| 2010/0037311 | A1 | 2/2010 | He et al. |
| 2010/0100616 | A1 | 4/2010 | Bryson et al. |
| 2010/0115080 | A1 | 5/2010 | Kageyama |
| 2010/0125667 | A1 | 5/2010 | Soundararajan |
| 2010/0165876 | A1 | 7/2010 | Shukla et al. |
| 2010/0287548 | A1 | 11/2010 | Zhou et al. |
| 2010/0322255 | A1 | 12/2010 | Hao et al. |
| 2011/0004913 | A1 | 1/2011 | Nagarajan et al. |
| 2011/0016467 | A1 | 1/2011 | Kane |
| 2011/0022695 | A1 | 1/2011 | Dalal et al. |
| 2011/0072486 | A1 | 3/2011 | Hadar et al. |
| 2011/0103259 | A1 | 5/2011 | Bay et al. |
| 2011/0113467 | A1 | 5/2011 | Agarwal et al. |
| 2011/0246637 | A1 | 10/2011 | Murakami |
| 2011/0321041 | A1 | 12/2011 | Bhat et al. |
| 2012/0210417 | A1* | 8/2012 | Shieh .................. H04L 63/0218 726/12 |
| 2012/0240182 | A1 | 9/2012 | Narayanaswamy et al. |
| 2013/0007740 | A1 | 1/2013 | Kikuchi et al. |
| 2013/0019277 | A1 | 1/2013 | Chang et al. |
| 2013/0028142 | A1 | 1/2013 | Beheshti-Zavareh et al. |
| 2013/0073743 | A1 | 3/2013 | Ramasamy et al. |
| 2013/0074181 | A1 | 3/2013 | Singh |
| 2013/0125120 | A1 | 5/2013 | Zhang et al. |
| 2013/0125230 | A1* | 5/2013 | Koponen ............ G06F 9/45533 726/13 |
| 2013/0151661 | A1 | 6/2013 | Koponen et al. |
| 2013/0163594 | A1 | 6/2013 | Sharma et al. |
| 2013/0227097 | A1 | 8/2013 | Yasuda et al. |
| 2013/0227550 | A1 | 8/2013 | Weinstein et al. |
| 2013/0268799 | A1 | 10/2013 | Mestery et al. |
| 2013/0332983 | A1 | 12/2013 | Koorevaar et al. |
| 2013/0347131 | A1 | 12/2013 | Mooring et al. |
| 2014/0068602 | A1 | 3/2014 | Gember et al. |
| 2014/0115578 | A1 | 4/2014 | Cooper et al. |
| 2014/0195666 | A1 | 7/2014 | Dumitriu et al. |
| 2014/0281030 | A1 | 9/2014 | Cui et al. |
| 2014/0282855 | A1 | 9/2014 | Clark et al. |
| 2014/0310796 | A1 | 10/2014 | Lee et al. |
| 2014/0325037 | A1 | 10/2014 | Elisha |
| 2015/0082417 | A1 | 3/2015 | Bhagwat et al. |
| 2015/0106913 | A1 | 4/2015 | Wang et al. |
| 2015/0281178 | A1 | 10/2015 | Raman et al. |
| 2015/0281179 | A1 | 10/2015 | Raman et al. |
| 2015/0281180 | A1 | 10/2015 | Raman et al. |
| 2018/0176180 | A1 | 6/2018 | Raman et al. |

FOREIGN PATENT DOCUMENTS

| | | |
|---|---|---|
| WO | 2007115425 A1 | 10/2007 |
| WO | 2008095010 A1 | 8/2008 |
| WO | 2012051884 A1 | 4/2012 |
| WO | 2013002766 A1 | 1/2013 |
| WO | 2013074828 A1 | 5/2013 |
| WO | 2013074847 A1 | 5/2013 |

OTHER PUBLICATIONS

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, Cisco.

Author Unknown, "Next-Generation Firewalls," Month Unknown 2013, 1 page, Palo Alto Networks.

Author Unknown, "Virtual Machine Mobility Planning Guide," Oct. 2007, 33 pages, Revision Oct. 18, 2007, VMware, Inc., Palo Alto, CA.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., U.S. Appl. No. 61/514,990, filed Aug. 4, 2011, 31 pages.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Mann, Vijay, et al., "Crossroads: Seamless VM Mobility Across Data Centers Through Software Defined Networking," IEEE Network Operations and Management Symposium (NOMS), Apr. 16-20, 2012, 9 pages, IEEE, Piscataway, NJ, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

(56) References Cited

OTHER PUBLICATIONS

Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.

* cited by examiner

MIGRATING FIREWALL CONNECTION STATE FOR A FIREWALL SERVICE VIRTUAL MACHINE

CLAIM OF BENEFIT TO PRIOR APPLICATIONS

This application is a continuation application of U.S. patent application Ser. No. 15/899,329, filed Feb. 19, 2018, now published as U.S. Patent Publication 2018/0176180. U.S. patent application Ser. No. 15/899,329 is a continuation application of U.S. patent application Ser. No. 14/231,646, filed Mar. 31, 2014, now issued as U.S. Pat. No. 9,906,494. U.S. patent application Ser. No. 15/899,329, now published as U.S. Patent Publication 2018/0176180, and U.S. patent application Ser. No. 14/231,646, now issued as U.S. Pat. No. 9,906,494, are incorporated herein by reference.

BACKGROUND

Firewalls are typically hardware appliances that are implemented at one or more points in a network topology in an enterprise or a datacenter. With the advent of software defined networking (SDN) and network virtualization (NV), traditional hardware appliances do not take advantage of flexibility and control that is provided by SDN and network virtualization. However, to date, there has been a dearth of good solutions for incorporating firewall services in a virtualized environment.

BRIEF SUMMARY

For a host that executes one or more guest virtual machines (GVMs), some embodiments provide a novel virtualization architecture for utilizing a firewall service virtual machine (SVM) on the host to check the packets sent by and/or received for the GVMs. In some embodiments, the GVMs connect to a software forwarding element (e.g., a software switch) that executes on the host to communicate with each other and with other devices operating outside of the host. Instead of connecting the firewall SVM to the host's software forwarding element, the virtualization architecture of some embodiments provides a novel SVM interface (SVMI) through which the firewall SVM can be accessed for the packets sent by and/or received for the GVMs.

In some embodiments, a firewall engine that executes on the host communicates with the firewall SVM through the SVMI, in order to have the SVM check the GVM packets. The firewall engine in some embodiments receives a set of attributes (called tuples) for a packet that is received for or sent by a GVM. The firewall engine forwards this set of attributes to the firewall SVM through the SVMI. The SVM then uses the attribute set to identify a rule that has a matching attribute set and an action. If the SVM finds such a rule, it returns to the firewall engine the rule's corresponding action, which in some embodiments is an "Allow" or "Deny." When the firewall SVM does not find a matching rule, it returns a default action in some embodiments. In other embodiments, the firewall SVM's rule set is defined such that the firewall SVM identifies at least one matching rule for each possible packet attribute set.

Upon receiving the returned action, the firewall engine returns the action to the module on the host that sent the attribute set to the firewall engine in the first place, so that this module can then perform the returned action or have the returned action performed, e.g., so that this module can allow or drop the packet. In some embodiments, the module that calls the firewall engine is part of (1) a port of the software forwarding element to which the packet's source or destination GVM attaches, or (2) a virtual network interface card (VNIC) of this GVM.

Multiple packets can have the same packet attribute sets, e.g., when the packets are part of one flow that is associated with one communication session between two machines. Accordingly, in addition to supplying the returned action to the firewall rule-check initiating module, the firewall engine of some embodiments also stores the returned action in a connection state data store that it can subsequently use to process firewall checks for other packets with similar attribute sets. Specifically, the connection state data store in some embodiments stores the actions that the firewall SVM returns for different packet attribute sets. In some embodiments, the connection state data storage stores each returned action with an identifier (e.g., a hash value) that is generated from the action's corresponding attribute set. Before checking with the firewall SVM for a particular packet attribute set, the firewall rule engine checks the connection state data store to determine whether this data store has a cached action for this packet set. If not, the firewall rule engine then checks with the firewall SVM. However, if the connection state data store has an entry for the particular packet attribute set, the firewall engine in some embodiments may forego checking with the firewall SVM, and instead may return the cached action of the matching entry to the rule-check initiating module.

Even when the connection state data store has a matching entry, the firewall SVM may configure firewall engine in some embodiments to check with the firewall SVM (1) to identify the action to perform for all packet attribute sets, irrespective of whether the SVM examined the packet attribute sets before, (2) to identify the action to perform for a packet attribute set each Nth time that the firewall engine receives the packet attribute set, and/or (3) to relay information about a packet attribute set that the firewall engine processes by examining its connection state data storage. In some embodiments, the firewall SVM configures the firewall engine through application program interface (API) commands of the SVMI.

Through the SVMI APIs, the firewall SVM configures the rule-checking behavior of the firewall engine upon receiving a packet's attribute set. In addition to the above-mentioned configured behaviors (e.g., to checking with the firewall SVM for each packet or for each Nth packet, or to relaying information about a packet), the configured behaviors in some embodiments also include other behaviors. For instance, the SVM might configure the firewall engine with configuration rules that specify how the firewall engine should check a packet that is exchanged between source and destination GVMs that execute on the same host. Absent special configuration, such a packet would cause the firewall engine in some embodiments to check twice with the firewall SVM, once for the source GVM and once for the destination GVM. However, through the SVMI APIs of some embodiments, the firewall SVM can configure the firewall engine to have the firewall SVM perform a check for such a packet only once, either for the source GVM or for the destination GVM.

In some embodiments, a GVM can migrate from a first host to a second host in a multi-host environment. For such environments, the SVMI APIs also allow the firewall SVM to specify the firewall engine's behavior to prepare for such a GVM migration. For instance, the SVMI APIs include a set of one or more APIs that allows a firewall SVM on the GVM's first host or second host to obtain the set of entries in the firewall engine's connection state data store that relate to the migrating GVM. Through this API set, the SVM on the first host can receive, update, and supply connection state information. The firewall engine of the first host can then send directly or indirectly (through a VM migrator executing on the host) the supplied connection state information to the firewall engine of the second host. Similarly, through this API set, the SVM on the second host can receive and possibly update connection state information from the firewall engine on the second host. Accordingly, this API set relieves the firewall SVMs on the first and second hosts from having to have a separate mechanism to synchronize their firewall states.

In some embodiments, the firewall engine that executes on a host is a GVM-level firewall rule engine that, in addition to its first function as the module interacting with the firewall SVM through the SVMI, performs a second firewall function. This second function entails enforcing a second set of firewall rules that is in addition to the first set of firewall rules enforced by the firewall SVM. In some embodiments, the firewall engine first effectuates the firewall SVM's rule check (e.g., by communicating with the firewall SVM and/or checking the connection state data store that the engine maintains for the SVM), and then performs its own rule check based on the second set of firewall rules that the engine enforces itself. In other embodiments, the firewall engine first performs its own rule check, and then effectuates the firewall SVM's rule check. In still other embodiments, the ordering of these rule checks, and/or the optional performance of these rule checks are configurable by an administrator. For instance, in some embodiments, both the firewall SVM and firewall engine rule checks are performed for one tenant with a GVM executing on a host, but only one of these rule checks (e.g., either the firewall SVM rule check or the firewall engine rule check) is performed for another tenant with another GVM on the host.

In some embodiments, the firewall rules for the SVM and the firewall engine are specified by different tools and/or different administrators. For instance, in some embodiments, different administrators specify the first SVM rule set and the second firewall engine rule set, and these administrators have different privileges for specifying firewall rules. Also, in some embodiments, the firewall SVM is provided by one vendor (e.g., a firewall vendor), while the firewall rule engine is provided by another vendor. In these embodiments, the firewall engine can be accessed to specify its rule set through a firewall engine interface (FEI). In some of these embodiments, the SVMI provides a more limited set of controls to the firewall engine than the FEI provides, because the SVM firewall comes from a second different vendor and hence should have less control over the firewall engine of the virtualization environment that is managed by a first vendor.

While the embodiments described above provide ways to integrate and communicate with firewall SVMs, one of ordinary skill in the art will realize that many embodiments of the invention are equally applicable to non-firewall SVMs. In other words, the methodologies and architecture described above are used in some embodiments to integrate and communicate with non-firewall SVMs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a host that executes one or more guest virtual machines (GVMs), some embodiments provide a novel virtualization architecture for utilizing a firewall service virtual machine (SVM) on the host to check the packets sent by and/or received for the GVMs. In some embodiments, the GVMs connect to a software forwarding element (e.g., a software switch) that executes on the host to communicate with each other and with other devices operating outside of the host. Instead of connecting the firewall SVM to the host's software forwarding element, the virtualization architecture of some embodiments provides a novel SVM interface (SVMI) through which the firewall SVM can be accessed for the packets sent by and/or received for the GVMs. In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

I. Architecture

Figure 1:
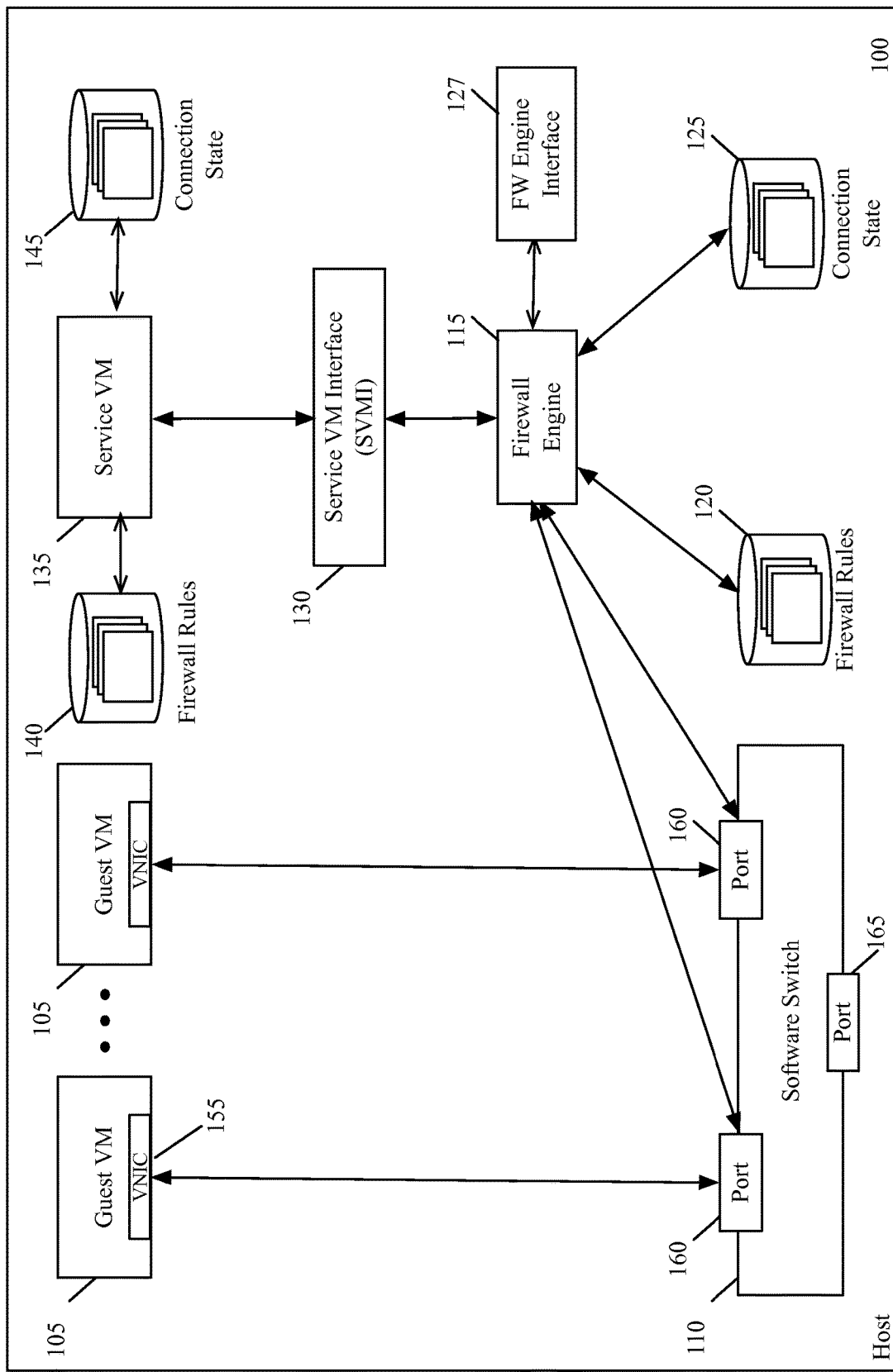
FIG. 1 illustrates an example of a virtualization architecture of a host computing device.

FIG. 1 illustrates an example of such a virtualization architecture of a host computing device (e.g., a server). Specifically, this figure shows a virtualization architecture 100 that includes an SVMI through which a firewall SVM can be accessed for packets sent by and/or received for the GVMs. As shown, this architecture includes several GVMs 105, a software forwarding element 110, a firewall engine 115, a firewall rule data storage 120, a connection state data storage 125, a firewall interface 127, an SVMI 130, a firewall SVM 135, a firewall rule data storage 140, and a connection state data storage 145. In some embodiments, the software forwarding element 110, the firewall engine 115, the firewall rule data storage 120, the connection state data storage 125, the firewall interface 127, the SVMI 130 operate in the kernel space of a hypervisor executing on the host, while the GVMs 105, the firewall SVM 135, the firewall rule data storage 140, and the connection state data storage 145 operate in the hypervisor's user space.

The GVMs are virtual machines executing on top of the hypervisor (not shown) that executes on the host. Examples of such machines include webservers, application servers, database servers, etc. In some cases, all the GVMs belong to one entity, e.g., an enterprise that operates the host. In other cases, the host executes in a multi-tenant environment (e.g., in a multi-tenant data center), and different GVMs may belong to one tenant or to multiple tenants.

As shown, each GVM 105 includes a virtual network interface card (VNIC) 155 in some embodiments. Each VNIC is responsible for exchanging packets between its VM and the software forwarding element. Each VNIC connects to a particular port of the software forwarding element 110. The software forwarding element 110 also connects to a physical network interface card (NIC) (not shown) of the host. In some embodiments, the VNICs are software abstractions of a physical NIC (PNIC) that are implemented by the virtualization software (e.g., by the hypervisor).

In some embodiments, the software forwarding element maintains a single port 160 for each VNIC of each VM. The software forwarding element 110 connects to a physical NIC (through a NIC driver (not shown)) to send outgoing packets and to receive incoming packets. In some embodiments, the software forwarding element 110 is defined to include a port 165 that connects to the PNIC's driver to send and receive packets to and from the PNIC.

The software forwarding element 110 performs packet-processing operations to forward packets that it receives on one of its ports to another one of its ports. For example, in some embodiments, the software forwarding element tries to use data in the packet (e.g., data in the packet header) to match a packet to flow based rules, and upon finding a match, to perform the action specified by the matching rule (e.g., to hand the packet to one of its ports 160 or 165, which directs the packet to be supplied to a destination GVM or to the PNIC).

In some embodiments, the software forwarding element 110 is a software switch, while in other embodiments it is a software router or a combined software switch/router. The software forwarding element 110 in some embodiments implements one or more logical forwarding elements (e.g., logical switches or logical routers) with software forwarding elements executing on other hosts in a multi-host environment. A logical forwarding element in some embodiments can span multiple hosts to connect GVMs that execute on different hosts but belong to one logical network. In other words, different logical forwarding elements can be defined to specify different logical networks for different users, and each logical forwarding element can be defined by multiple software forwarding elements on multiple hosts. Each logical forwarding element isolates the traffic of the GVMs of one logical network from the GVMs of another logical network that is serviced by another logical forwarding element. A logical forwarding element can connect GVMs executing on the same host and/or different hosts.

Figure 2:
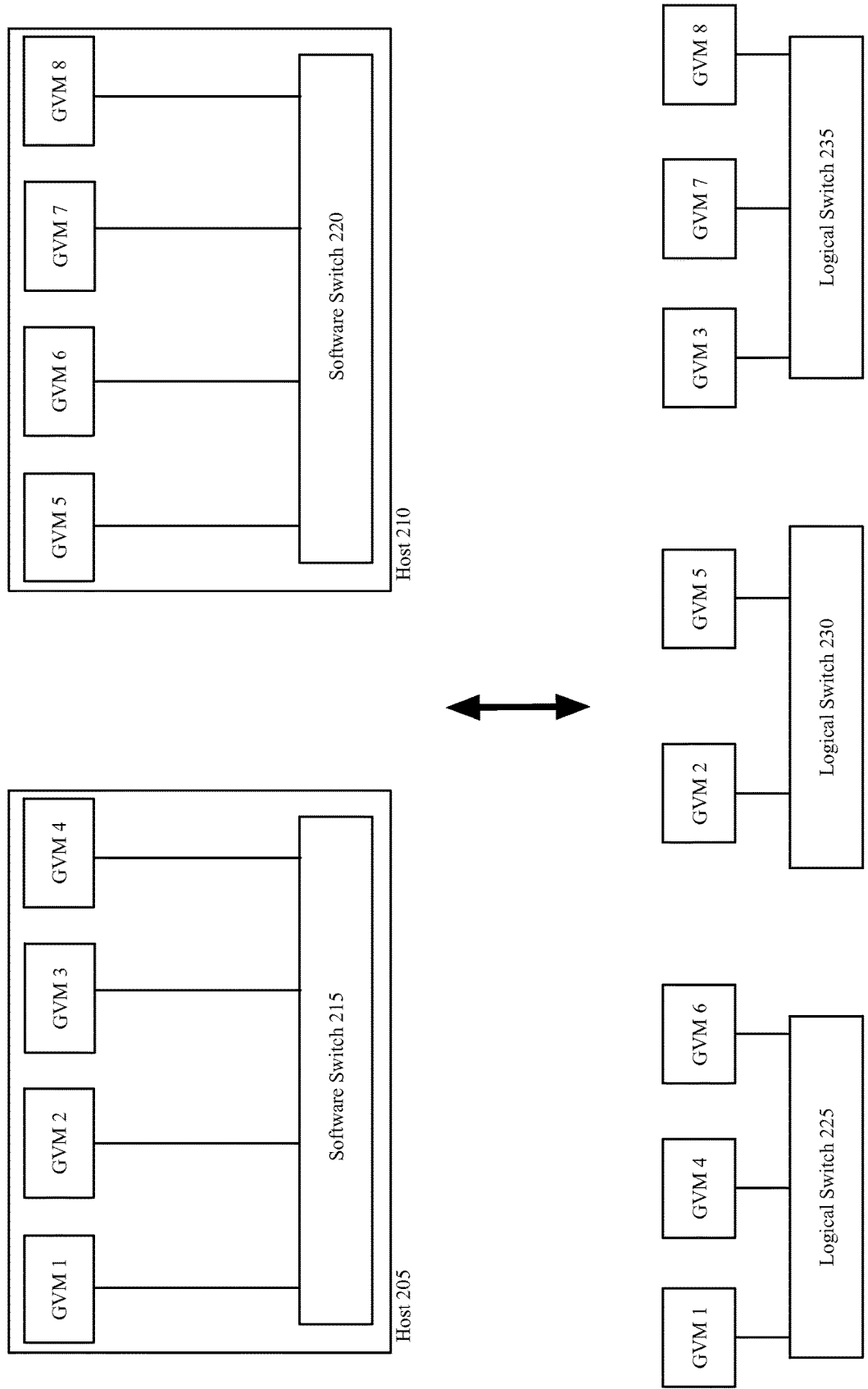
FIG. 2 illustrates an example of several logical switches that are defined by multiple software switches that execute on multiple hosts.

FIG. 2 illustrates an example of several logical switches that are defined by multiple software switches that execute on multiple hosts. Specifically, this figure illustrates eight GVMs (GVM 1 to GVM 8) that execute on two hosts 205 and 210 that include two software switches 215 and 220. As shown, the two software switches 215 and 220 implement three logical switches 225, 230, and 235 that connect three sets of GVMs for three different entities (e.g., three different tenants). Logical switch 225 connects GVMs 1 and 4 of host 205 and GVM 6 of host 210, logical switch 230 connects GVM 2 of host 205 and GVM 5 of host 210, and logical switch 235 connects GVMs 7 and 8 of host 210 and GVM 3 of host 205.

In hypervisors, software switches are sometimes referred to as virtual switches because they operate in software and they provide the GVMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

Returning to FIG. 1, the ports of the software forwarding element 110 in some embodiments include one or more function calls to one or more modules that implement special input/output (I/O) operations on incoming and outgoing packets that are received at the ports. In some embodiments, one or two of these function calls can be to the firewall engine 115, which, as further described below, performs firewall operations on incoming and/or outgoing packets (i.e., on packets that are received by the host for one of the GVMs or on packets that are sent by one of the GVMs). Other examples of I/O operations that are implemented by the ports 160 include ARP broadcast suppression operations and DHCP broadcast suppression operations, as described in U.S. patent application Ser. No. 14/070,360. Other I/O operations can be so implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the firewall function calls), instead of the ports.

As mentioned above, the firewall engine 115 can be called for incoming or outgoing packets to check whether such packets should be delivered to a VM or sent from a VM. To perform this check, the forwarding element port 160 that calls the firewall engine supplies a set of attributes of a packet that the port receives. In some embodiments, the set of packet attributes are packet identifiers, such as traditional five tuple identifiers, which include the packet's source identifier, destination identifier, source port, destination port, and protocol (service). Before supplying these identifiers to the firewall engine, the forwarding element port extracts these identifiers from a packet that it receives. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in logical domain, while other identifier values are defined in the physical domain.

In some embodiments, the firewall engine can perform the firewall rule check itself based on firewall rules that it enforces, or it can have the firewall SVM perform this check based on firewall rules that the firewall SVM enforces. In other words, the firewall engine 115 in some embodiments performs two functions, one as the module interacting with the firewall SVM 135 through the SVMI 130, and the other as a firewall engine that enforces its own firewall rules. In the embodiments described below, the firewall engine performs these two functions for an incoming or outgoing GVM packet (i.e., for a packet received by the port) in response to two different calls from a port 160 to which the GVM connects. However, one of ordinary skill in the art will realize that in other embodiments, the firewall engine 115 can perform these two functions in response to one call from the port 160.

The firewall engine 115 stores the firewall rules that it enforces in the firewall rules data storage 120. To enforce these rules, the firewall engine 115 tries to match the received packets attribute set with corresponding attribute sets that are stored for the firewall rules. In some embodiments, each firewall rule in the data storage 120 is specified in terms of (1) the same set of packet identifiers (e.g., five-tuple identifiers) that the firewall engine receives from the port, and (2) an action that is typically specified as an "allow" to allow a packet through or a "deny" to drop the packet. An identifier in a firewall rule can be specified in terms of an individual value or a wildcard value in some embodiments. In other embodiments, the identifier can further be defined in terms of a set of individual values or an abstract container, such as a security group, a compute construct, a network construct, etc.

Figure 3:
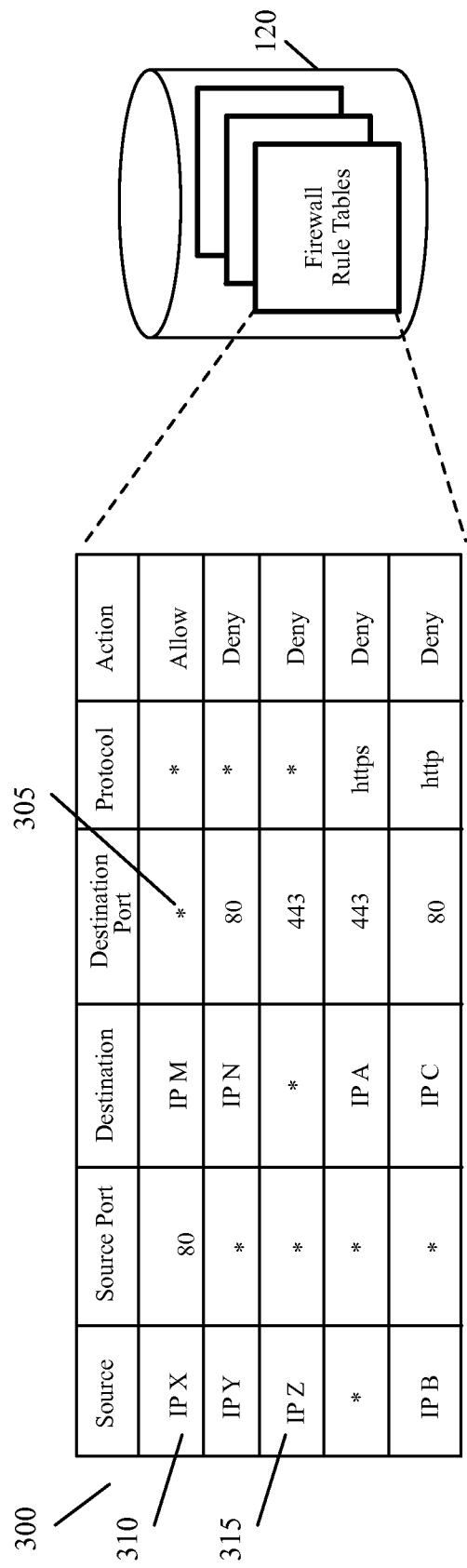
FIG. 3 illustrates an example of firewall rules that are specified in terms of the traditional five-tuple packet identifiers.

FIG. 3 illustrates an example of firewall rules 300 that are specified in terms of the traditional five-tuple packet identifiers. As shown in this figure, these identifiers include the packet's source identifier, destination identifier, source port, destination port, and protocol (service). This figure shows that some identifiers are specified in terms of individual values (e.g., IP address X for source identifier 305), other identifiers are specified in terms of wildcard values (e.g., destination identifier 310), and other identifiers are specified in terms of abstract containers (e.g., Web Server container for source identifier 315). The members of an abstract container can be specified through any number of mechanisms, e.g., through a list that specifies the IP addresses for the members of the abstract container.

To match a received set of packet attributes with the rules, the firewall engine compares the received set of attributes with the associated identifiers (e.g., five-tuple identifiers) of the firewall rules stored in the firewall rule data storage 120. Upon identifying a matching rule, the firewall engine 115 returns to the port the action (e.g., the Allow or the Deny) of the matching rule. In some embodiments, the firewall rule data storage 120 is defined in a hierarchical manner to ensure that a packet rule check will match higher priority rule before matching a lower priority rule, when packet's identifiers match multiple rules. Also, in some embodiments, the firewall rule data storage 120 contains a default rule that specifies a default action for any packet rule check that cannot match any other firewall rules; this default rule will be a match for all possible set of packet identifiers, and ensures that the firewall rule engine will return an action for all received set of packet identifiers.

Multiple packets can have the same packet attribute sets, e.g., when the packets are part of one flow that is associated with one communication session between two machines. Accordingly, in addition to supplying the returned action to the port, the firewall engine of some embodiments stores the returned action in a connection state data storage 125 that it can subsequently use to process firewall checks for other packets with similar attribute sets. Specifically, the connection state data storage 125 in some embodiments stores the actions that the firewall engine 115 returns for different packet attribute sets. In some embodiments, the connection state data storage 125 stores each returned action with an identifier (e.g., a hash value) that is generated from the action's corresponding attribute set. Before checking with the firewall rule data storage 120 for a particular packet attribute set, the firewall rule engine 115 of some embodiments checks the connection state data storage 125 to determine whether this storage has a cached action for this packet attribute set. If not, the firewall rule engine then checks the firewall rule data storage 120. When the connection state data storage has an entry for the particular packet attribute set, the firewall engine returns the cached action of the matching entry to the rule-check initiating port 160.

Figure 4:
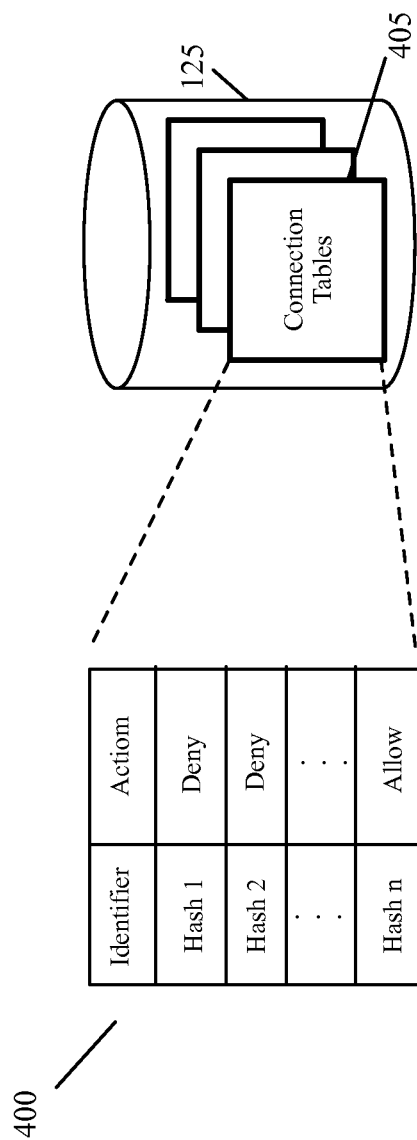
FIG. 4 illustrates an example of connection state data stored in a connection state data storage of some embodiments.

FIG. 4 illustrates an example of connection state data 400 stored in a connection state data storage 125 of some embodiments. As shown, this data storage includes multiple connection state tables 405, one for each GVM executing on the host of the firewall engine 115. Each table stores one or more connection state entries, with each entry corresponding to a packet attribute set checked by the firewall engine or firewall SVM, as described below. Each entry is specified in terms of a hash value and an action. The hash value is a value that is generated from the five-tuple identifiers of the packets. The connection state entries include the hash values because these values make it easier for the firewall engine to search quickly the connection state tables. In addition to the hash value and action, the connection state entries in some embodiments include other parameters, such as statistics regarding the connections that are associated with each entry. For instance, in some embodiments, a connection state entry includes a count of the number of times that the firewall engine identified the entry as a matching entry for a received packet (i.e., a count of the number of packets that have matched this entry).

As mentioned above, the forwarding element's port also calls the firewall engine 115 of FIG. 1 when it wants the firewall SVM 135 to perform a firewall check for a packet that the port receives. In some embodiments, the firewall engine 115 first effectuates the firewall SVM's rule check (e.g., by communicating with the firewall SVM and/or checking a connection state data storage that the engine maintains for the SVM, as mentioned below), and then performs its own rule check based on the second set of firewall rules that the engine enforces itself. In other embodiments, the firewall engine first performs its own rule check, and then effectuates the firewall SVM's rule check. In still other embodiments, the ordering of these rule checks, and/or the optional performance of these rule checks are configurable by an administrator. For instance, in some embodiments, both the firewall SVM and firewall engine rule checks are performed for one tenant with a GVM executing on a host, but only one of these rule checks (e.g., either the firewall SVM rule check or the firewall engine rule check) is performed for another tenant with another GVM on the host.

In different embodiments, the firewall engine 115 uses different mechanisms to determine that it has to call the firewall SVM 135 to perform a firewall rule check for a received packet attribute set. In some embodiments, the firewall engine 115 ascertains that it has to call the firewall SVM 135 when it receives a particular type of call from the port 160. In response to such a call, it directly calls the firewall SVM 135. In other embodiments, after receiving the call from the port 160, the firewall engine 115 matches the received packet attribute set to a rule in the firewall rule data storage 120, or a rule in another firewall rule data storage (not shown) that it maintains separately for the firewall SVM. This rule then contains a redirect command that directs the firewall engine 115 to redirect the received packet attribute set to the firewall SVM 135, so that this SVM can perform the rule check. Examples of both these approaches will be further described below by reference to FIGS. 8 and 9.

The firewall engine communicates with the firewall SVM 135 through the SVMI 130, in order to have the SVM check the GVM's packets. For this check, the firewall engine in some embodiments receives the set of packet attributes (e.g., the five tuples) that the port identified for (e.g., extracted from) the packet. The firewall engine 115 forwards the received set of attributes to the firewall SVM 135 through the SVMI 130. The SVM 135 then uses the attribute set to identify a rule in its firewall rule data storage 140 that has a matching attribute set and an action. If the SVM finds such a rule, it returns to the firewall engine the rule's corresponding action, which in some embodiments is an "Allow" or "Deny." When the firewall SVM 135 does not find a matching rule, it returns a default action in some embodiments. In other embodiments, the firewall SVM's rule set is defined such that the firewall SVM can identify at least one matching rule for each possible packet attribute set. In some embodiments, the firewall data storage 140 has a structure similar to the structure of the firewall data storage that was described above by reference to FIG. 3.

As shown, the firewall SVM also has a connection state data storage 145. Whenever the firewall SVM identifies a rule in the firewall rule data storage 140 that matches a particular received set of packet attributes, the firewall SVM not only returns the matching rules action, but also stores the returned action in the connection state data storage 140 that it can subsequently use to process firewall checks for other packets with similar attribute sets. In some embodiments, the connection state data storage stores each returned action with an identifier (e.g., a hash value) that is generated from the action's corresponding attribute set (e.g., corresponding five tuples). Before checking with the firewall data storage 140 for a particular packet attribute set, the firewall SVM 135 checks the connection state data storage 145 to determine whether this storage has a cached action for this attribute set. If not, the firewall SVM 135 checks the firewall rule data storage 140. When the connection state data storage 145 has an entry for the particular packet attribute set, the firewall SVM 135 returns the cached action of the matching entry to the firewall engine 115 through the SVMI. In some embodiments, the connection state data storage 145 has a structure similar to the structure of the connection state data storage that was described above by reference to FIG. 4.

Upon receiving the returned action, the firewall engine 115 returns the action to the port 160 that sent the attribute set to the firewall engine in the first place, so that the port can perform the returned action or have the returned action performed, e.g., so that this module can allow or drop the packet. In addition to supplying the returned action to the port, the firewall engine of some embodiments also stores the returned action in the connection state data storage 125 so that it can subsequently use this record to process firewall checks for other packets with similar attribute sets.

Specifically, the connection state data storage 125 in some embodiments stores the actions that the firewall SVM 135 returns for different packet attribute sets. As mentioned above, the connection state data storage 125 in some embodiments stores each returned action with an identifier (e.g., a hash value) that is generated from the action's corresponding attribute set. Before checking with the firewall SVM for a particular packet attribute set, the firewall rule engine checks the connection state data storage 125 to determine whether this storage 125 has a cached action for this packet set. If not, the firewall rule engine then checks with the firewall SVM. However, if the connection state data storage 125 has an entry for the particular packet attribute set, the firewall engine in some embodiments may forego checking with the firewall SVM, and instead may return the cached action of the matching entry to the rule-check initiating module. Even when the connection state data storage 125 has a matching entry, the firewall SVM 135 may configure firewall engine 115 in some embodiments to check with the firewall SVM (1) to identify the action to perform for all packet attribute sets, irrespective of whether the SVM examined the packet attribute sets before, (2) to identify the action to perform for a packet attribute set each Nth time that the firewall engine receives the packet attribute set, and/or (3) to relay information about a packet attribute set that the firewall engine processes by examining its connection state data storage.

In some embodiments, the firewall SVM configures the firewall engine through application program interface (API) commands of the SVMI. Through the SVMI APIs, the firewall SVM 135 configures the rule-checking behavior of the firewall engine 115 upon receiving a packet's attribute set. In addition to the above-mentioned configured behaviors (e.g., to checking with the firewall SVM for each packet or for each Nth packet, or to relaying information about a packet), the configured behaviors in some embodiments also include other behaviors. For instance, the SVM 135 might configure the firewall engine 115 with configuration rules that specify how the firewall engine should check a packet that is exchanged between source and destination GVMs that execute on the same host. Absent special configuration, such a packet would cause the firewall engine in some embodiments to check twice with the firewall SVM, once for the source GVM and once for the destination GVM. However, through the SVMI APIs of some embodiments, the firewall SVM can configure the firewall engine to have the firewall SVM perform a check for such a packet only once, either for the source GVM or for the destination GVM. More details about interaction between firewall SVM and source and destination GVMs when the source and destination GVMs are on the same host are discussed below in Section IV.

In some embodiments, a GVM can migrate from a first host to a second host in a multi-host environment. For such environments, the SVMI APIs also allow the firewall SVM to specify the firewall engine's behavior to prepare for such a GVM migration. For instance, the SVMI APIs include a set of one or more APIs that allow a firewall SVM on the GVM's first host or second host to obtain the set of entries in the firewall engine's connection state data storage 125 that relate to the migrating GVM. Through this API set, the SVM on the first host can receive, update, and supply connection state information. The firewall engine of the first host can then send directly or indirectly (through a VM migrator executing on the host) the supplied connection state information to the firewall engine of the second host. Similarly, through this API set, the SVM on the second host can receive and possibly update connection state information (e.g., sometimes update and other times do not update) from the firewall on the second host. Accordingly, this API set relieves the firewall SVMs on the first and second hosts from having to have a separate mechanism to synchronize their firewall state. More details about migration of a GVM from one host to another host of a datacenter and its relation with the firewall SVMs of the two hosts are discussed below in Section III.

In some embodiments, the firewall rules in the firewall rule data storages 120 and 140 are specified by different tools and/or different administrators. For instance, in some embodiments, different administrators specify the rules in the firewall data storage 120 and the firewall data storage 140, and these administrators have different privileges for specifying firewall rules. Also, in some embodiments, the firewall SVM 135 is provided by one vendor (e.g., a firewall vendor), while the firewall rule engine 115 is provided by another vendor.

In some of these embodiments, the firewall engine can be accessed to specify its rule set through the firewall engine interface (FEI) 115. In some of these embodiments, the SVMI provides a more limited set of controls to the firewall engine than the FEI provides, because the firewall engine 115 is provided by the virtualizing hypervisor, while the SVM firewall comes from a second different vendor and hence should have less control over the firewall engine of the that is managed by the hypervisor.

Figure 5:
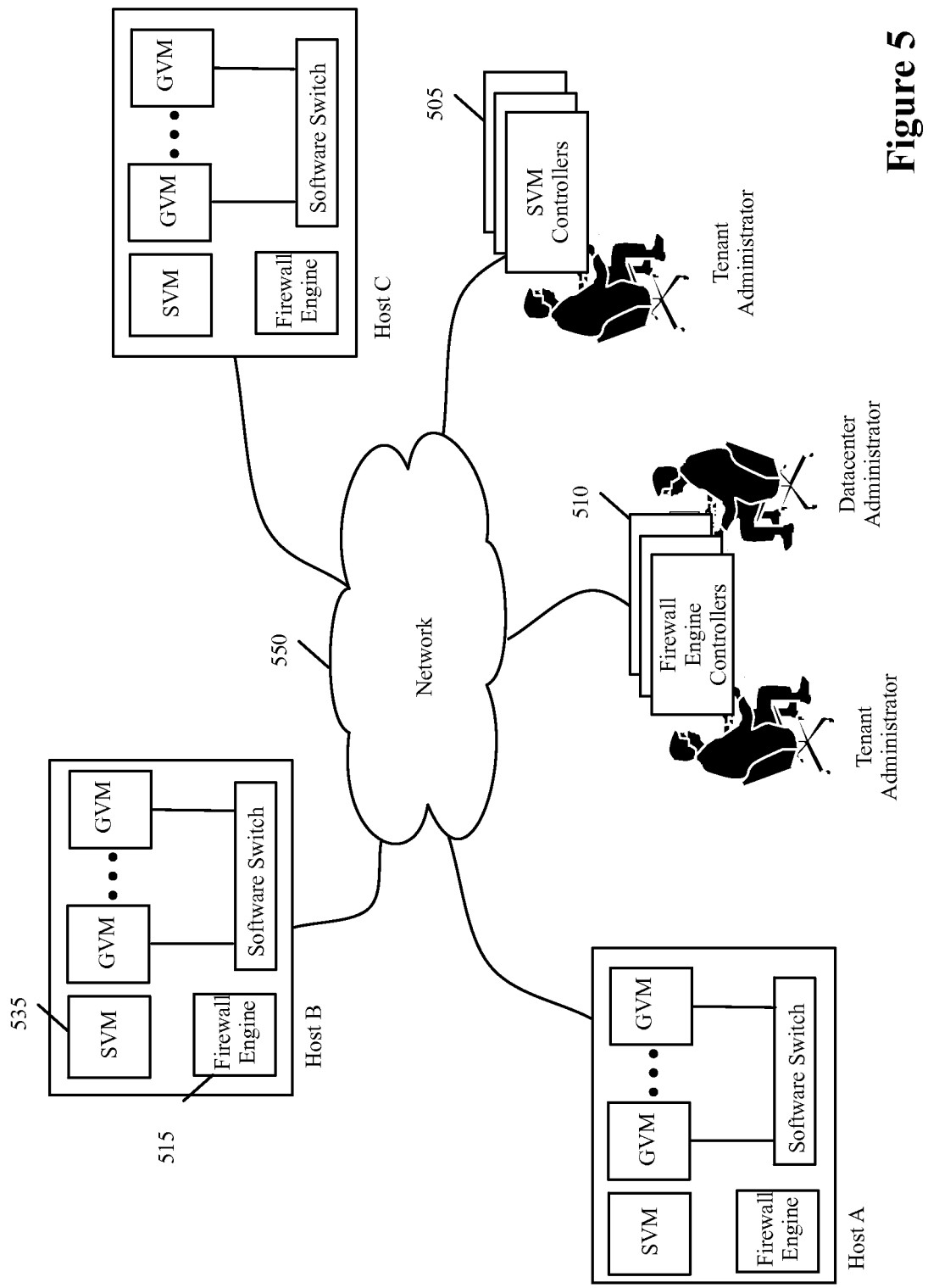
FIG. 5 illustrates an example of how the service virtual machines (SVMs) are managed differently than the hypervisor firewall engines in some embodiments.

FIG. 5 illustrates an example of how the SVMs are managed differently than the hypervisor firewall engines in some embodiments. This figure illustrates multiple hosts in a datacenter. As shown, each host includes a firewall SVM 535 (like the SVM 135) and a hypervisor firewall engine 515 (like firewall engine 115). As shown, the firewall SVMs 535 in some embodiments are managed by one set of SVM controllers 505, while the hypervisor firewall engines 515 are managed by another set of controllers 510. Both sets of controllers communicate with the hosts through a network 550 (e.g., through a local area network, a wide area network, a network of networks (such as the Internet), etc.). The hosts are also communicatively connected through this network 550.

The different sets of controllers might be accessible by different sets of administrators in some embodiments. For example, in the example illustrated in FIG. 5, the firewall engine controller set 510 can be accessed by both tenant and datacenter administrators to specify the firewall rules of the hypervisor firewall engines 515, while the SVM controller set 505 can be accessed by only tenant administrators to specify the firewall rules of the SVM firewalls 535. In other embodiments, the SVM controller set 505 can be accessed by only datacenter administrators. In still other embodiments, the firewall engine controller set 510 can be accessed by either only tenant administrators or datacenter administrators to specify the firewall rules of the hypervisor firewall engines 515, while the SVM controller set 505 can be accessed by both tenant and datacenter administrators to specify the firewall rules of the SVM firewalls 535. In yet other embodiments, both controller sets 505 and 510 can be accessed by tenant and datacenter administrators.

Figure 6:
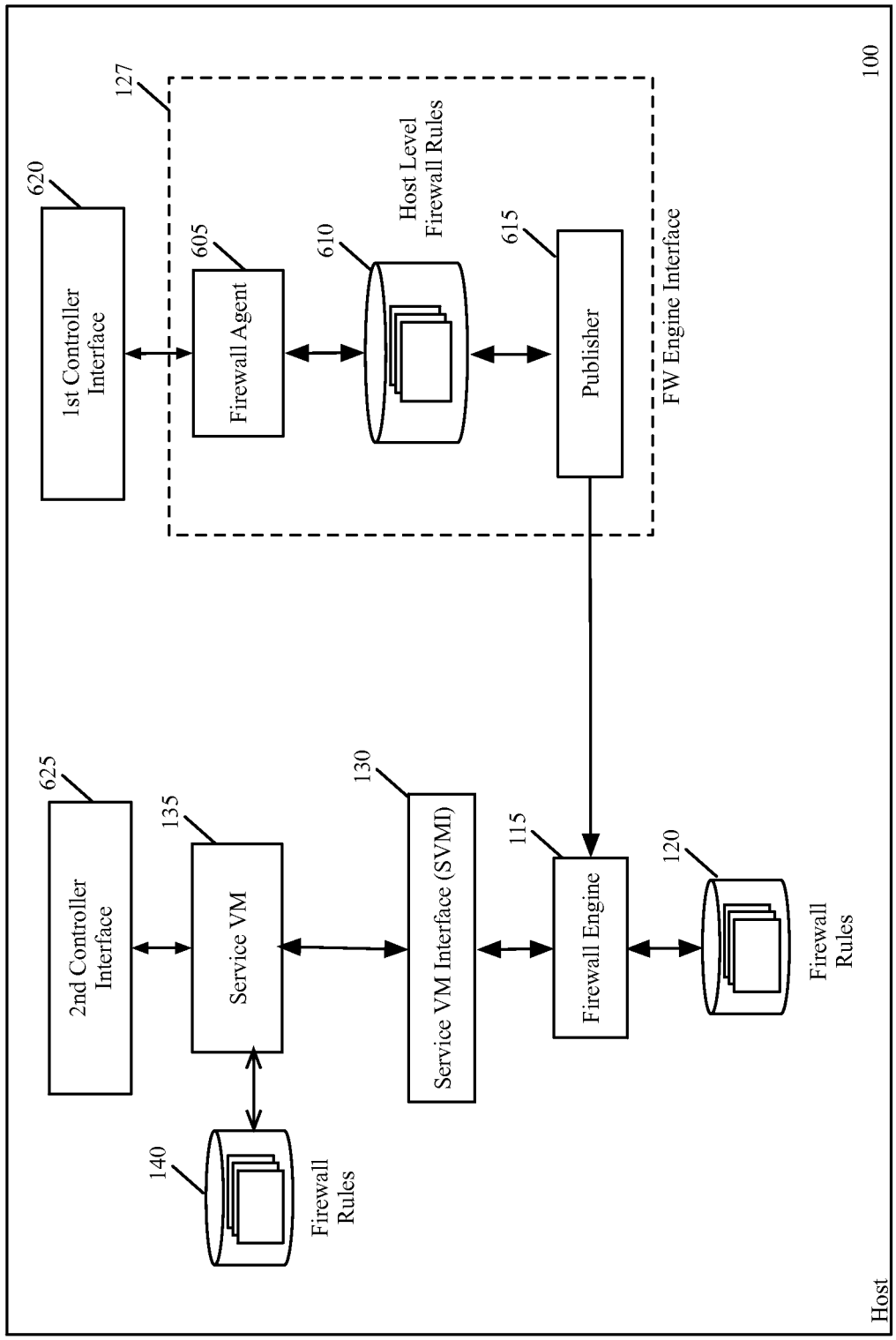
FIG. 6 illustrates the modules of the virtualization architecture of a host that are used to configure the firewall rules of the firewall SVM and the hypervisor firewall engine.

FIG. 6 illustrates the modules of the virtualization architecture 100 of a host that are used to configure the firewall rules of the firewall SVM and the hypervisor firewall engine. This figure shows that the firewall engine interface 127 in some embodiments includes a firewall agent 605, a host-level firewall data storage 610, and a firewall rule publisher 615. It also shows two controller interfaces 620 and 625.

The controller interface 620 is used by the firewall interface 127 to interact with the firewall engine controller set 510 of FIG. 5 to obtain and update firewall rules for the firewall engine. In some embodiments, this interaction is managed by the firewall agent 605. This agent receives hypervisor firewall rules from the controller set 510 through the controller interface 620, and stores these firewall rules in the host-level firewall rule data storage 610. This data storage 610 stores the firewall rules for all the GVMs executing on the host. In some embodiments, this storage also stores firewall rules from any GVM that may be instantiated on the host, so that in case the GVM migrates from another host, the rules for this GVM are already available on the host.

The publisher 615 detects changes to the firewall rules in the host data storage 610. In response to any detected change (e.g., addition, deletion or modification of firewall rules), the publisher pushes firewall rules that are affected by the detected change to the firewall engine 115. In some embodiments, the firewall engine maintains different firewall rule tables for different GVMs. In some of these embodiments, the publisher pushes the firewall rules for the different GVMs to the different firewall rule tables through the firewall engine 115. When the firewall engine is checking the firewall rules for a received packet from or to a GVM, the firewall engine checks the firewall rules in the firewall rule table that it maintains for that GVM.

The controller interface 625 is used by the firewall SVM 135 to interact with the SVM controller set 505 to obtain and update firewall rules for the firewall SVM. The SVM receives SVM firewall rules from the controller set 505 through the controller interface 625, and stores these firewall rules in the firewall rule data storage 140. In some embodiments, the SVM maintains different firewall rule tables for different GVMs, while in other embodiments the SVM maintains firewall rules for different GVMs in one table.

Each controller interface 620 or 625 communicates with a controller in its corresponding controller set through a network interface (e.g., web server) and the network 550. In the example illustrated in FIG. 6, two different controller interfaces 620 and 625 are used for the firewall SVM and the hypervisor firewall engine, because these two engines are configured by two different controller sets. In other embodiments, however, the virtualization architecture uses one controller interface for both firewall engines.

The architecture 100 of FIGS. 1 and 6 was described above by reference to numerous details. However, one of ordinary skill in the art will realize that this architecture can be implemented differently in other embodiments. For instance, in FIG. 1, the firewall engine 115 uses one connection state data storage 125 for connections (flows) checked by both the SVM 135 and the firewall engine 115. In other embodiments, however, the firewall engine uses two different connection state data storages, one for the connections that it checks and another one for the connections checked by the SVM.

Other embodiments may also use different firewall rule engines. For instance, some embodiments use one firewall rule engine for a third-party firewall SVM and another firewall rule engine for the hypervisor. Still other embodiments use one firewall rule engine for each tenant on a multi-tenant host. Alternatively, embodiments use the firewall engine 115 to facilitate firewall rule checks of the SVM (i.e., the firewall engine 115 does not perform any of its own firewall rule checks). Also, in other embodiments, the firewall rule engine 115 is not used to access the SVM, and instead the firewall rule-checking module (e.g., the port 160) calls the SVM through the SVMI.

While the embodiments described above and below provide ways to integrate and communicate with firewall SVMs, one of ordinary skill in the art will realize that many embodiments of the invention are equally applicable to non-firewall SVMs. In other words, the methodologies and architecture described above are used in some embodiments to integrate and communicate with non-firewall SVMs.

II. Firewall Rule Checking Processes

Figure 7:
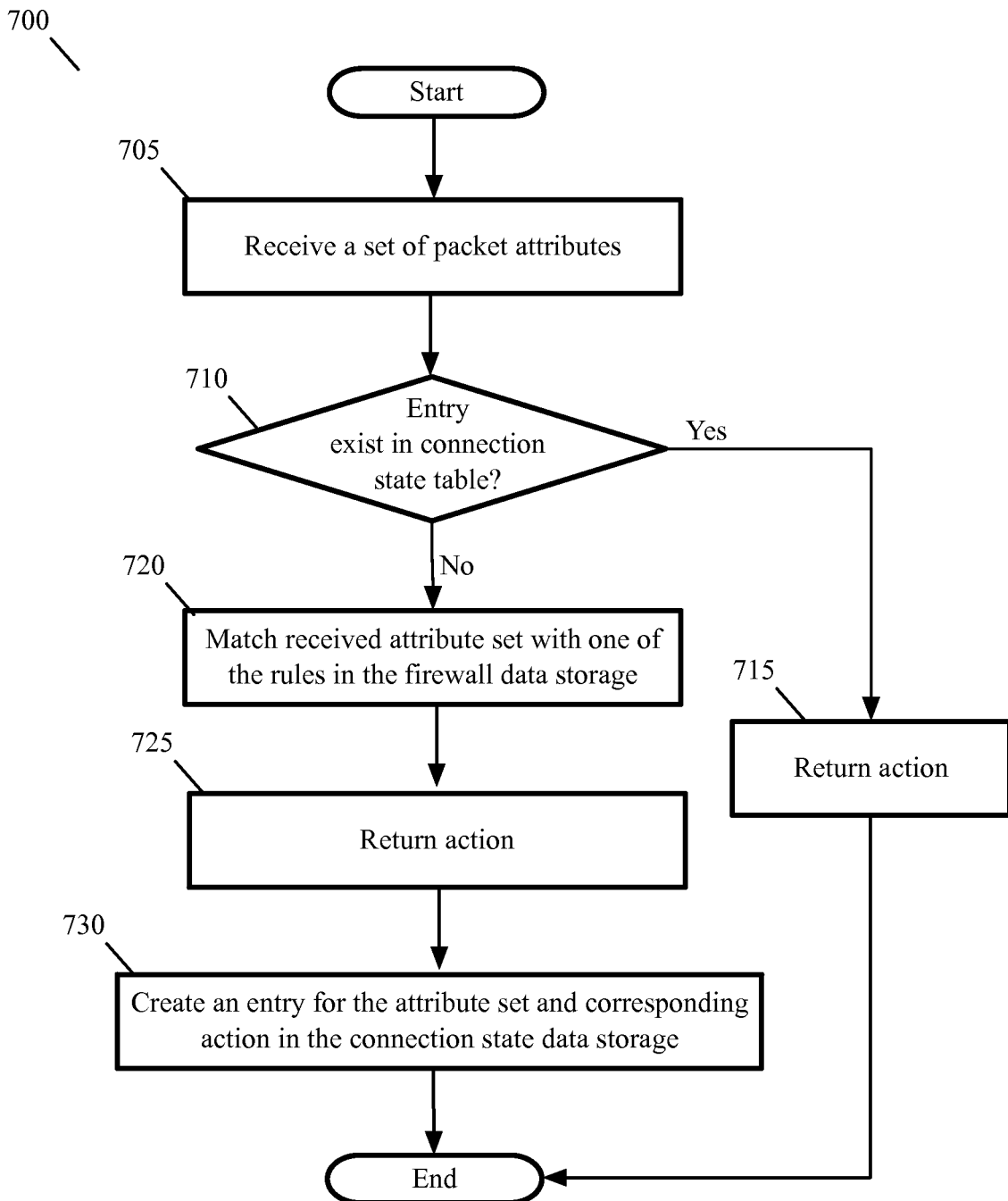
FIG. 7 conceptually illustrates a process that the hypervisor firewall engine performs when it is called by a port to enforce its own firewall rules for a received packet.

FIG. 7 conceptually illustrates a process 700 that the hypervisor firewall engine performs when it is called by a port 160 to enforce its own firewall rules for a received packet. As shown, the process 700 starts (at 705) when it receives a set of attributes to check for a received packet. In some embodiments, the received attributes are the packet identifiers that the port extracted from the packet. For instance, in some embodiments, the received attributes set includes the packet's extracted five tuples.

Next, at 710, the process 700 determines whether it has an entry for the received packet attribute set in its connection state data storage 125. This is because the firewall engine may have previously performed a firewall rule check for another packet with an identical set of attributes, and cached the result of this check in the connection state data storage 125. As the entries in the connection state data storage 125 are specified in terms of hashes of the packet attribute sets, the process 700 computes (at 710) a hash value from the received attribute set, and tries to match this hash value to a hash value of an entry in the connection state data storage 125.

When the process identifies (at 710) an entry in the connection state data storage 125 that matches the received packet attribute set (e.g., has a hash value that matches the computed hash value), the process returns (at 715) to the port the action of the identified entry (e.g., the Allow or Deny), and then ends. On the other hand, when the process cannot identify (at 710) an entry in the connection state data storage 125, the process identifies (at 720) the firewall rule in the firewall data storage 120 that matches the received packet attribute set. To identify the firewall rule, the process 700 searches the firewall rule data storage 120 to identify the entry that has an attribute set (e.g., has five tuples) that match the received packets attribute set (e.g., match the five tuples extracted from the packet).

In some embodiments, the firewall rule data storage 120 is defined in a hierarchical manner to ensure that a packet rule check will match higher priority rule before matching a lower priority rule, when packet's identifiers match multiple rules. Also, in some embodiments, the firewall rule data storage 120 contains a default rule that specifies a default action for any packet rule check that cannot match any other firewall rules; this default rule will be a match for all possible set of packet identifiers, and ensures that the firewall rule engine will return an action for all received set of packet identifiers.

After identifying the matching firewall rule, the process 700 returns (at 725) to the port the action that is specified in the matching firewall rule. After 725, the process creates (730) an entry in the connection state data storage 125 for the received attribute set and the action that the process identified for this attribute set. To create this entry, the process 700 in some embodiments generates a hash value from the received packet attribute set, and stores this hash value along with the action of the matching firewall rule that it identified at 725 as the entry in the connection state data storage 125. After 730, the process ends.

Figure 8:
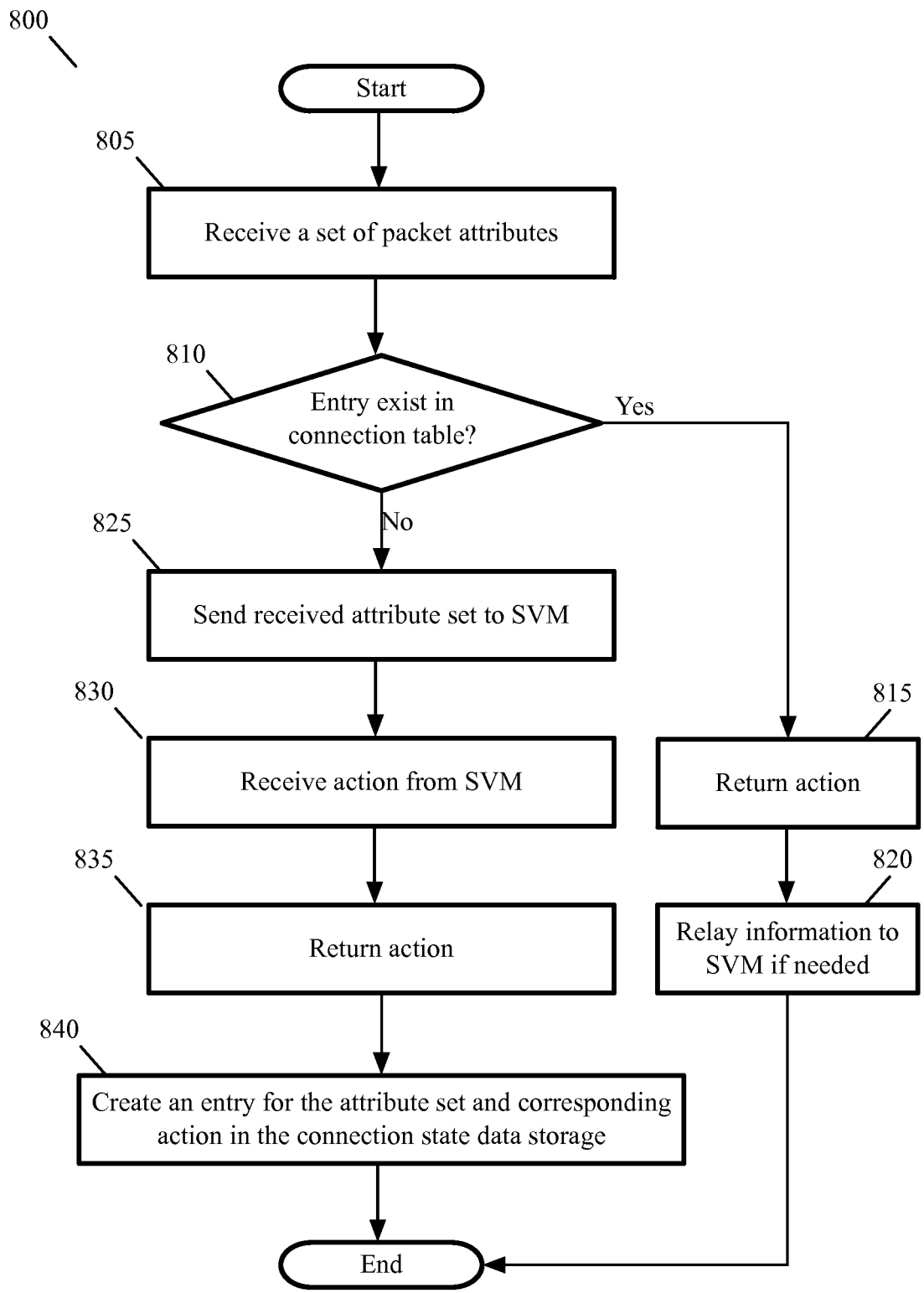
FIGS. 8 and 9 conceptually illustrate processes that the firewall engine performs when it is called by a port to have the SVM firewall enforce its firewall rules for a received packet.

FIG. 8 conceptually illustrates a process 800 that the firewall engine 115 performs when it is called by a port 160 to have the SVM firewall enforce its firewall rules for a received packet. As shown, the process 800 starts (at 805) when it receives a set of attributes with a request to have the SVM to check this received set of attributes. As mentioned above, the received attributes are the packet identifiers (e.g., five tuple identifiers) that the port extracted from the packet.

Next, at 810, the process 800 determines whether it has an entry for the received packet attribute set in the connection state data storage 125. This is because the SVM may have previously performed a firewall rule check for another packet with an identical set of attributes, and the firewall engine 115 may have cached the result of this check in the connection state data storage 125. As mentioned above, to check the connection state data storage 125, the firewall engine 115 computes (at 810) a hash value from the received attribute set, and tries to match this hash value to a hash value of an entry in the connection state data storage 125.

When the process 800 identifies (at 810) an entry in the connection state data storage 125 that matches the received packet attribute set (e.g., identifies a hash value that matches the computed hash value), the process returns (at 815) to the port the action of the identified entry (e.g., the Allow or Deny). After 815, the process in some embodiments relays information to the SVM regarding the packet matching the cached firewall rule, and then ends.

In other embodiments, the process 800 performs differently upon identifying an entry in the connection state data storage 125 that matches the received packet attribute set. For instance, in some embodiments, the process checks a configuration file (defined by the hypervisor or by the SVM) to determine whether it should first notify the SVM of the match, before reporting the result of the match to the port. This is in case the SVM may wish to modify the returned action. In still other embodiments, the process 800 checks with the SVM 135 even before it examines (at 810) the connection state table. For instance, in some embodiments, the process 800 first checks with the SVM for a particular attribute set, so that the SVM can first check the particular attribute set or can direct the process (i.e., the firewall engine) to check the connection state data storage 125 for an entry that matches the received attribute set. In other words, the process 800 in some embodiments checks a configuration file to determine whether it should check with the SVM 135 to see if it should examine (at 810) the connection state data storage 125.

When the process cannot identify (at 810) an entry in the connection state data storage 125, the process sends (at 825) the received packet attribute set to the SVM through the SVMI. In some embodiments, the SVM performs its firewall rule check for the received packet attribute set by examining its firewall rule data storage 140 and/or its connection state data storage 145, which were described above. From the SVM, the process 800 receives (at 830) the action of the firewall rule that matched the received packet attribute set.

The process 800 then returns (at 835) to the port the received action. After 835, the process creates (at 840) an entry in the connection state data storage 125 for the received attribute set and the action received at 830. To create this entry, the process 800 in some embodiments generates a hash value from the received packet attribute set, and stores this hash value along with the received action as the entry in the connection state data storage 125. After 840, the process ends.

In the approach illustrated in FIG. 8, the firewall engine 115 forwards the firewall rule check for a received packet attribute set directly to the firewall SVM 135 when it receives a particular type of call (e.g., an SVM rule check call) from the port 160. However, in other embodiments, the firewall engine 115 uses different mechanisms to determine that it has to call the firewall SVM 135 to perform a firewall rule check for a received packet attribute set.

Figure 9:
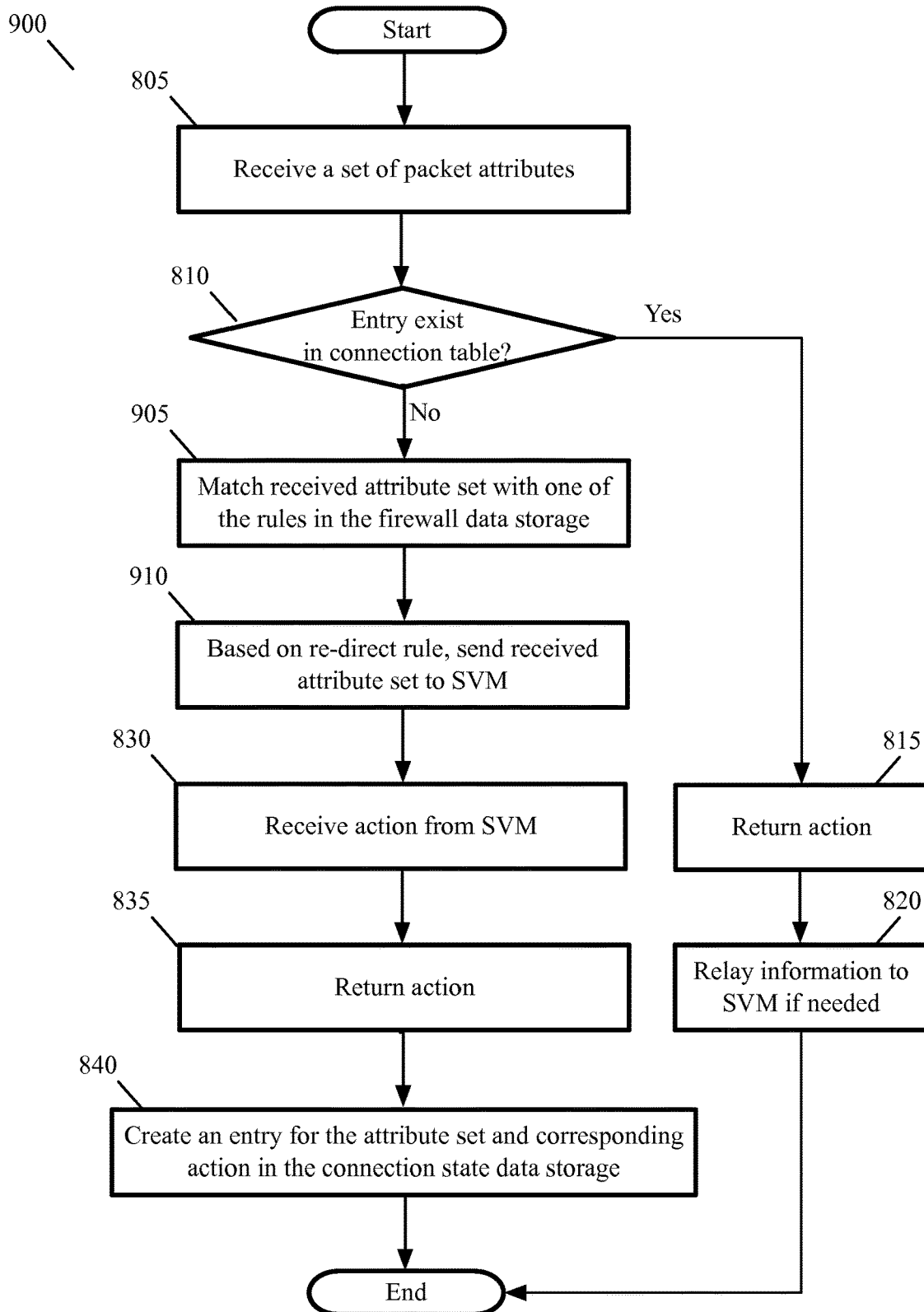

FIG. 9 conceptually illustrates a process 900 that employs one such alternative mechanism. In this approach, after receiving the call from the port 160, the firewall engine 115 matches the received packet attribute set to a rule in the firewall rule data storage (not shown) that the firewall engine maintains separately for the firewall SVM. This rule then contains a redirect command that directs the firewall engine 115 to redirect the received packet attribute set to the firewall SVM 135, so that this SVM can perform the rule check.

The process 900 is similar to the process 800 of FIG. 8, except that after it determines (at 810) that a matching entry does not exist in the connection state data storage 125, the process 9 matches (at 905) the received packet attribute set to a rule in the firewall rule data storage (not shown in FIG. 1) that the firewall engine maintains for the SVM 135. This rule directs the firewall engine 115 to redirect the received packet attribute set to the firewall SVM 135, so that this SVM can perform the rule check. Accordingly, after 905, the process 900 sends (at 910) the received packet attribute set to the firewall SVM 135 based on the redirect command of the matching firewall rule. Other than these two operations, the process 900 is similar to the process 800 of FIG. 8.

III. Connection State Migration With VM Migration

A GVM in some embodiments can migrate from a first host to a second host in a multi-host environment. For such environments, the APIs of the SVMI 130 allow the firewall SVM 135 to specify the firewall engine's behavior to prepare for such a GVM migration. For instance, the SVMI APIs include a set of one or more APIs that allow a firewall SVM on the GVM's first host or second host to obtain the set of entries in the firewall engine's connection state data storage 125 that relate to the migrating GVM. Through this API set, the SVM on the first host can receive, update, and supply connection state information. The firewall engine of the first host can then send directly or indirectly (through a VM migrator executing on the host) the supplied connection state information to the firewall engine of the second host. Similarly, through this API set, the SVM on the second host can receive and possibly update connection state information from the firewall engine on the second host. Accordingly, this API set relieves the firewall SVMs on the first and second hosts from having to have a separate mechanism to synchronize their firewall states.

Figure 10:
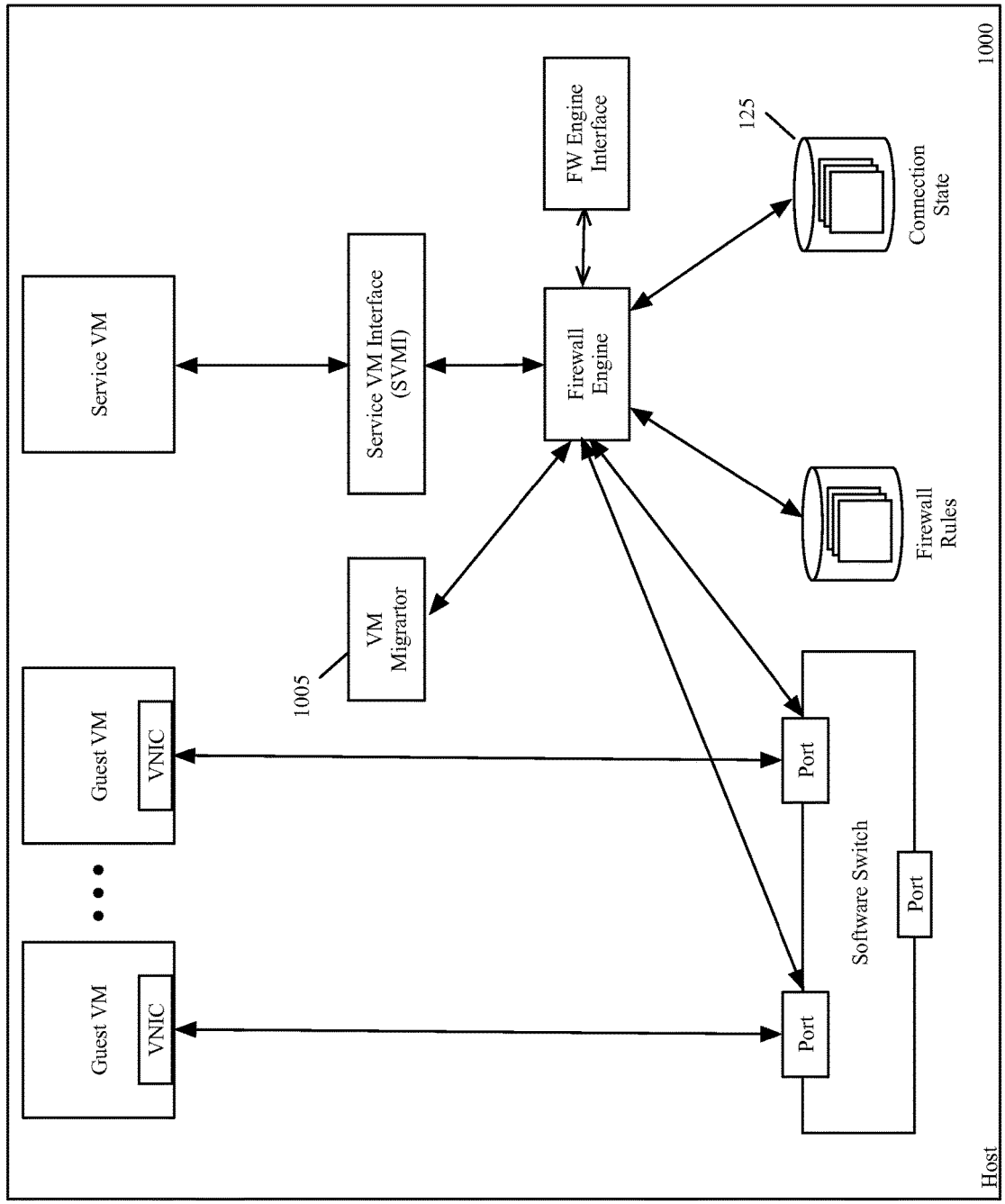
FIG. 10 illustrates a virtualization architecture of a host for some embodiments of the invention.

FIG. 10 illustrates a virtualization architecture 1000 of a host for some embodiments of the invention. As shown, this architecture is identical to the architecture 100 except that it includes a VM migrator 1005. The VM migrator 1005 communicates with VM migrators on other hosts in order to facilitate and coordinate the live migration of a GVM from one host to another. Part of these coordination operations in some embodiments is the transfer of the firewall SVM connection state entries for the migrating VM from the connection state data storage 125 of first host (from which the GVM migrates) to the connection state data storage 125 of the second host (to which the GVM migrates). In some embodiments, the VM migrator is part of the hypervisor virtualization application. For instance, in some embodiments, the VM migrator is the vMotion migrator of the ESX hypervisor of VMware Inc. In some embodiments, the VM migrator operates in the kernel space of the hypervisor.

Figure 11:
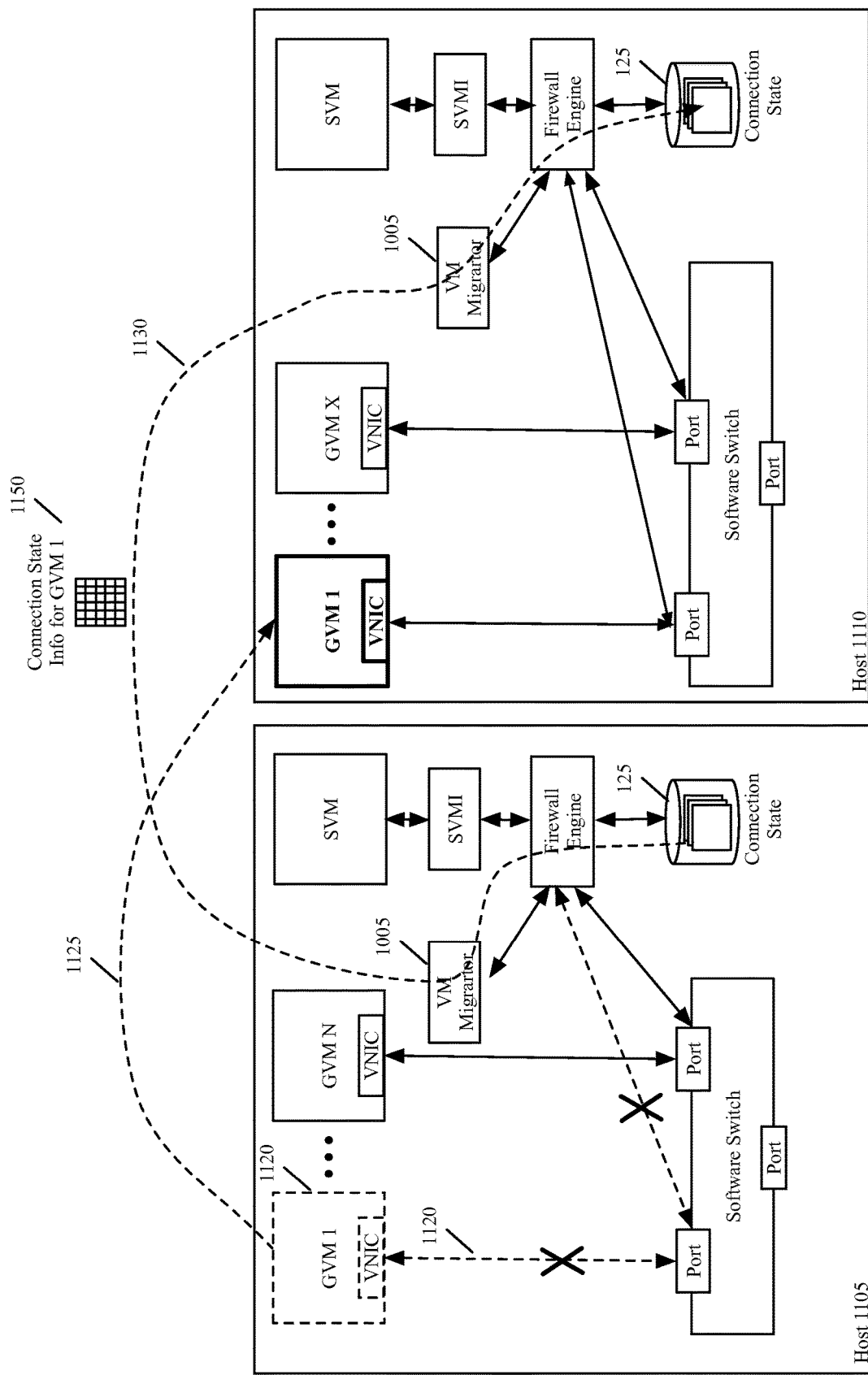
FIG. 11 illustrates a general example of the migration operation of the VM migrator during a GVM's migration.

FIG. 11 illustrates a general example of the migration operation of the VM migrator 1005 during a GVM's migration. This figure shows a GVM (GVM 1) migrating from a first host 1105 to a second host 1110. Specifically, in this figure, GVM 1 is shown after it has been instantiated on the second host 1110. Two sets of dashed lines 1120 and 1125 indicate that GVM 1 was previously executing on the first host 1105, and that this GVM has migrated from the first host 1105 to the second host 1110.

Another set of dashed lines 1130 conceptually represent the operation of the VM migrators 1005 of the hosts 1105 and 1110 in gathering the connection state entries for GVM 1 from the connection state data storage 125 of the first host 1105, and moving these entries to the second host 1110, where they are stored in the connection state data storage 125 of the second host 1110. As shown in FIG. 11, the VM migrators 1005 in some embodiments interact with the firewall engines 125 to gather the connection state entries from the storage 125 on the host 1105, and to supply the connection state entries to the storage 125 on the host 1110. In other embodiments, the VM migrators directly querying the storages 125 to read and write data to these storages.

In the embodiments that store the connection state entries for a GVM in one table in the connection state data storage 125, the migrated entries 1150 are all the records in the GVM's table in the connection state data storage 125. In some embodiments, these records only include the records related to the connection state information for the firewall SVM's rule processing (i.e., it includes only cached entries that are stored for an action the firewall SVM specifies for an attribute set that it processes). In other embodiments, these records also include the records related to the connection state information for the firewall rules that the firewall engine 115 processes (i.e., it includes cached entries that are stored for an action the firewall engine specifies for an attribute set that this engine processes).

Figure 12:
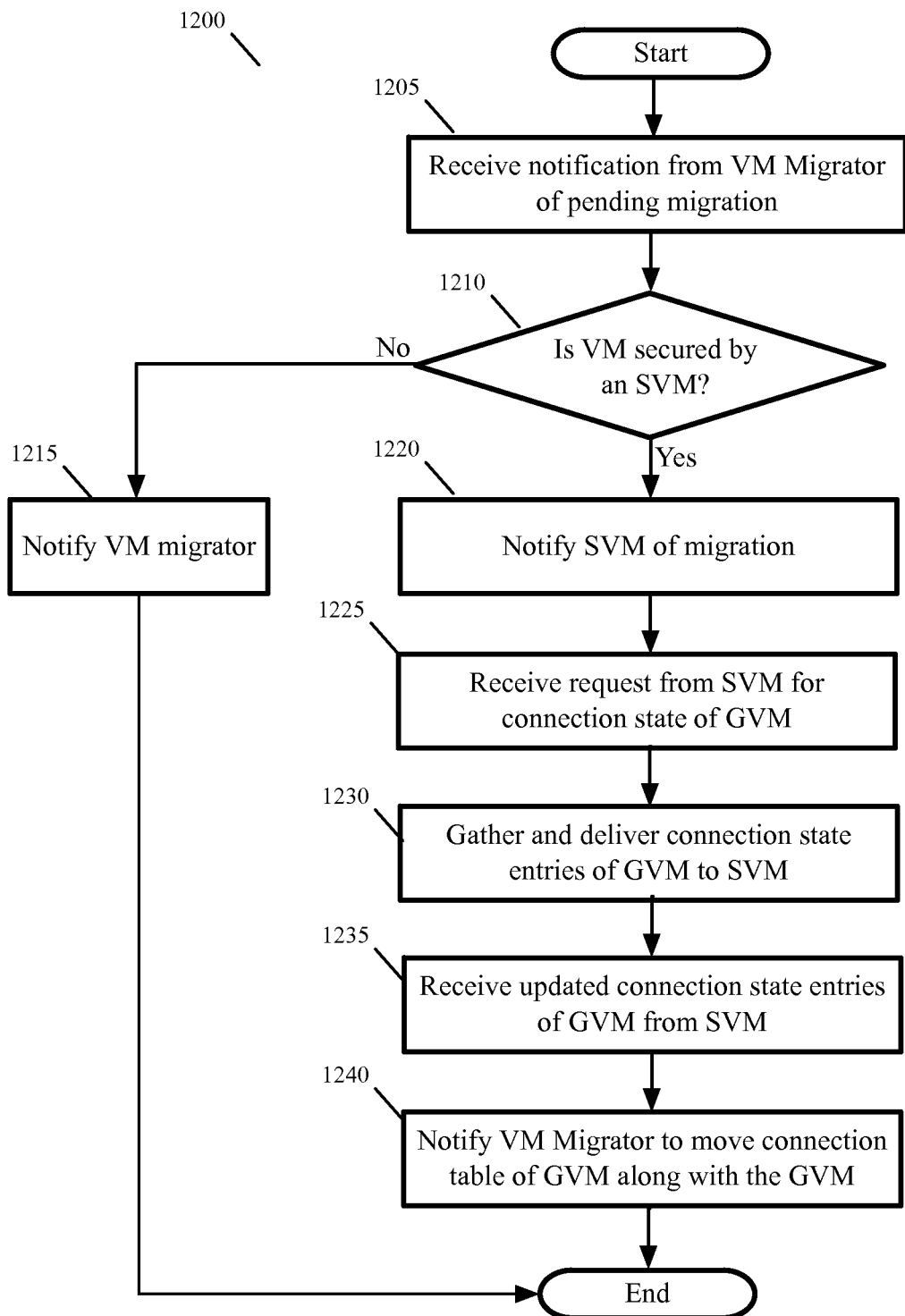
FIGS. 12 and 13 conceptually illustrate a process that the firewall engine performs in some embodiments when it is notified of a GVM's impending migration.

FIG. 12 conceptually illustrates a process 1200 that the firewall engine 115 performs in some embodiments when it is notified of a GVM's impending migration. The engine 115 performs this process to inform the firewall SVM of the impending migration, so that the SVM can obtain and potentially update the connection state data for the migrating GVM, and then supply the connection state data to the firewall engine, so that this engine can have the VM migrator 1005 move this data to the new host. This process is described by reference to FIG. 13, which shows a data flow diagram that illustrates how the engine performs the operations of the process 1200. The SVMI is not illustrated in FIG. 13 in order to simplify this drawing. However, one or ordinary skill in the art will realize that the communication between the firewall engine 115 and the SVM 135 in this figure goes through the SVMI 130.

Figure 13:
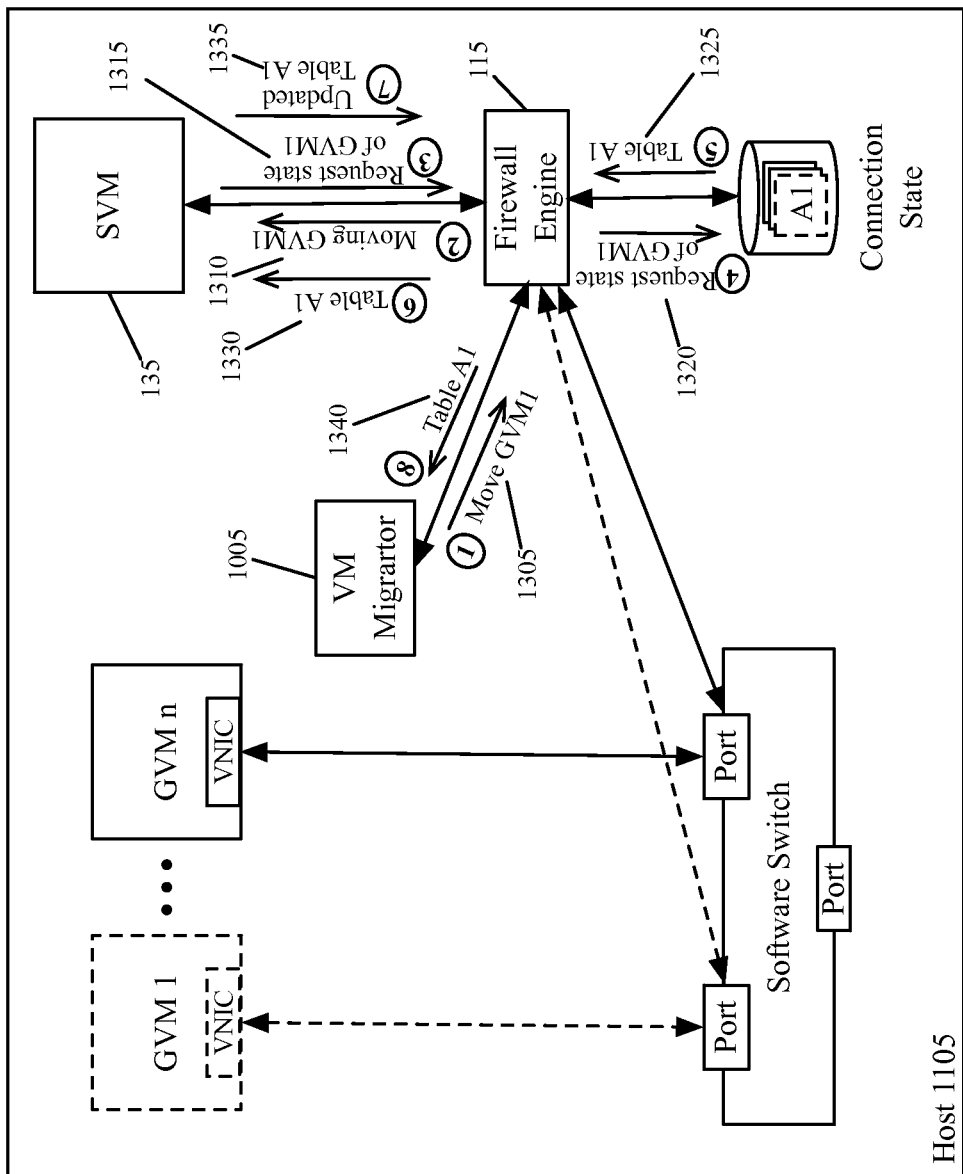

As shown, the process 1200 initially starts (at 1205) when the firewall engine 115 receives a notification from the VM migrator 1005 that a particular GVM is migrating from a first host (i.e., the host of the firewall engine) to a second host. FIG. 13 illustrates this notification 1305 from the VM migrator to the firewall engine.

The process then determines (at 1210) whether the migrating GVM is protected by the firewall SVM. If not, the process 1200 notifies (at 1215) the VM migrator 1005 that it does not have any SVM firewall connection state that it has to move for the firewall SVM, and then ends. As mentioned above, in some embodiments, the firewall engine enforces its own firewall rules, and the VM migrator not only moves the firewall SVM connection state, but also the connection state of the firewall rules enforced by the firewall engine. The firewall engine of these embodiments performs a separate process to gather the connection state associated with its own firewall rules, and provides the gathered state data to the VM migrator to move the state data.

When the process determines (at 1210) that the migrating GVM is protected by the firewall SVM, it notifies (at 1220) the firewall SVM 135 of the migration of the GVM, as shown by notification 1310 from the firewall engine to the SVM in FIG. 13. It then receives (at 1225) a request from the firewall SVM for all connection state entries that the firewall engine has stored in the connection state data storage 125 for the firewall SVM processing of incoming and/or outgoing packets of the migrating GVM. This request is illustrated as communication 1315 in FIG. 13.

Upon receiving the request, the process 1200 gathers (1230) the connection state entries that the firewall engine maintains for the SVM 135 and the migrating GVM in the connection state data storage 125. This collection is illustrated as operations 1320 and 1325 in FIG. 13. After gathering this data, the process 1200 supplies (at 1230) the gathered connection state data to the firewall SVM, as illustrated by communication 1330 in FIG. 13.

The firewall SVM in some embodiments has the firewall engine gather and supply the connection state data that it maintains for the firewall SVM, so that it can review and potentially update this data (e.g., sometimes update this data while other times not updating this data) before this data is migrated to the new host. This procedure allows the firewall SVM to capture any connection state data that is not maintained by the firewall engine, or is not up to date in the records maintained by the firewall engine (e.g., does not account for changes to the connection state that may have not yet been relayed from the SVM to the firewall engine). This procedure also relieves the firewall SVMs on different hosts from having their own independent synchronization method, as it allows these SVMs to utilize the synchronization method of the firewall engine and the VM migrator. As mentioned above, the firewall engine and the VM migrator are part of the hypervisor in some embodiments and perform these synchronization operations as part of the hypervisor service functions.

After receiving the gathered connection state data, the firewall SVM reviews and potentially updates the gathered state data, and then supplies (at 1235) the connection state data that should be migrated to the firewall engine. The supplying of this connection state data is illustrated as operation 1335 in FIG. 13. Upon receiving the connection state data, the process 1200 supplies (at 1240) the received connection state data to the VM migrator (as shown by communication 1340 in FIG. 13), so that the VM migrator 1005 can forward this state data to the VM migrator of the second host. After 1240, the process ends.

Figure 14:
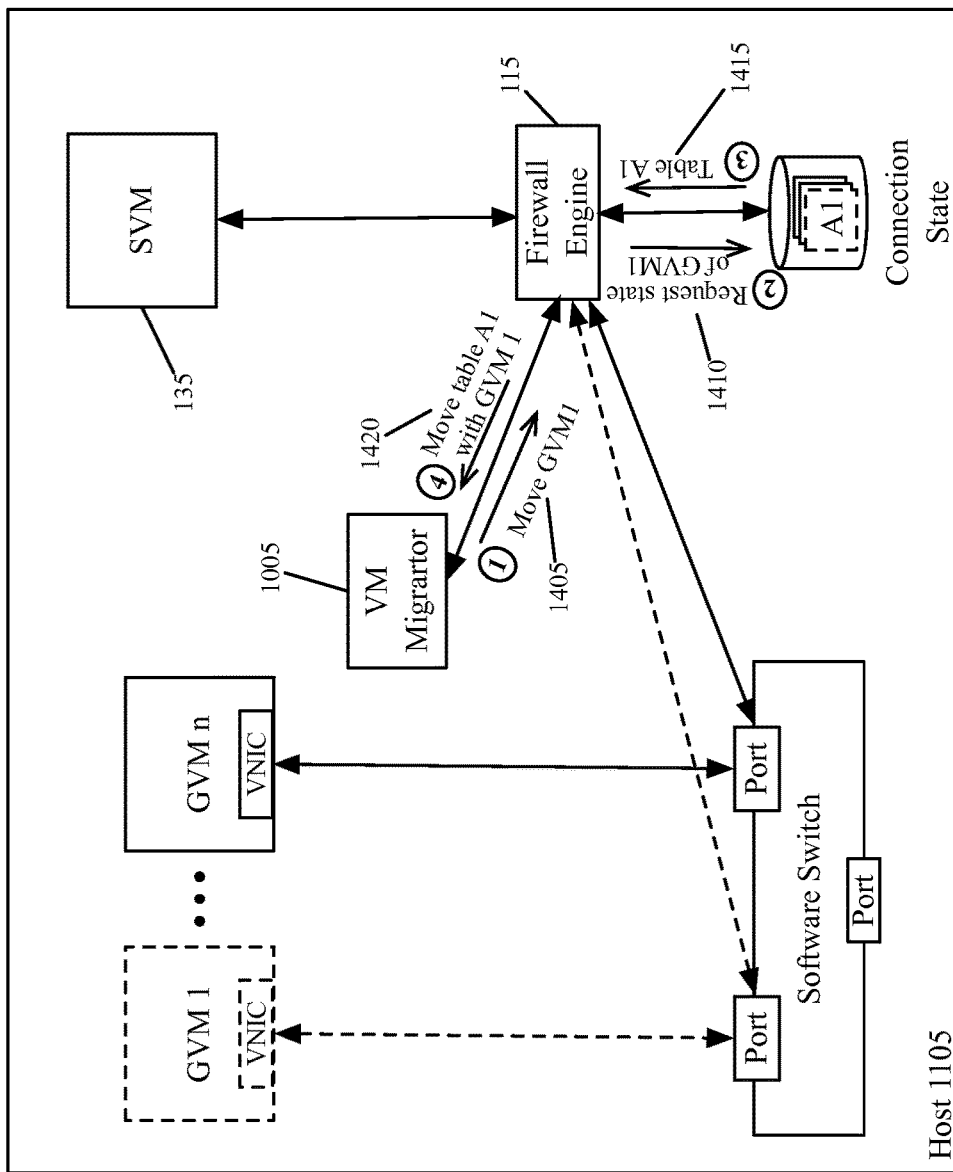
FIGS. 14 and 15 illustrate two other processes that the firewall engine performs in other embodiments when it is notified of a GVM's impending migration.
Figure 15:
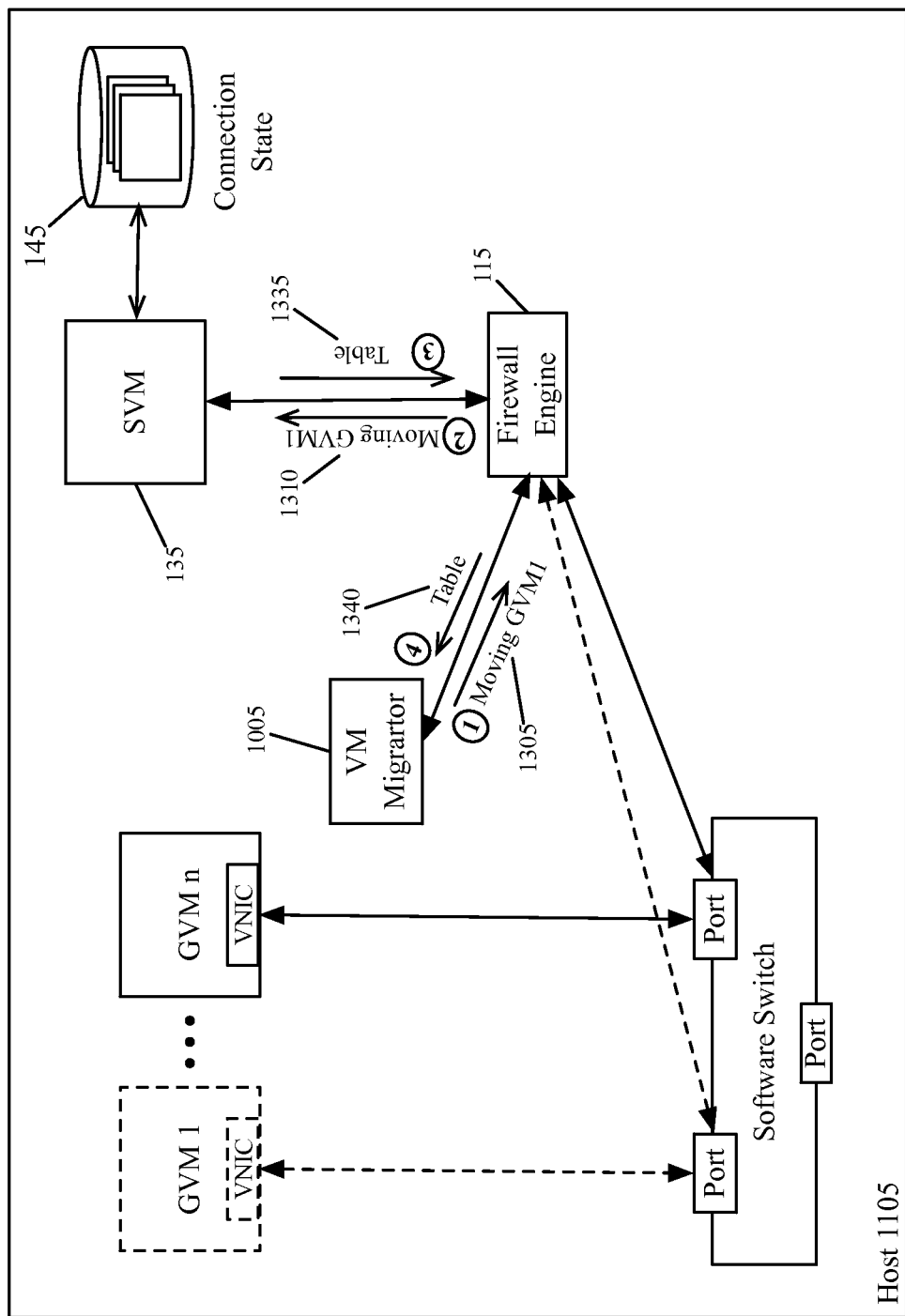

The approach illustrated in FIGS. 12 and 13 is just one way that the firewall SVM 135 can configure the firewall engine to provide connection state data for a migrating GVM. FIGS. 14 and 15 illustrate two other approaches. FIG. 14 illustrates an approach whereby the firewall SVM 135 configures the firewall engine to gather all the connection state data for a migrating GVM from just its own connection state data storage 125. Thus, as shown, the firewall engine 115 in this approach does not communicate with the firewall SVM 135 during the gathering of the connection state data, and just gathers this data from its own local storage 125. After gathering this data, the firewall engine supplies this data to the VM migrator to transfer this data to the new host of the migrating GVM.

In some embodiments, the firewall engine 115 uses the state gathering approach of FIG. 14 to gather the connection state data for the hypervisor firewall rules (the non-SVM firewall rules) that the firewall engine enforces itself. By migrating its firewall connection state data, the firewall engine allows a hypervisor firewall engine 115 on the new host to perform its hypervisor firewall rule enforcement based on the transferred connection state data.

FIG. 15 illustrates an approach that is the opposite approach to the approach shown in FIG. 14 for gathering the SVM firewall connection state data. In this approach, the firewall SVM 135 configures the firewall engine to gather all the connection state data for a migrating GVM form just the firewall SVM 135. Thus, as shown, the firewall engine 115 in this approach does not gather any connection state data from its own local connection data storage 125. Instead, the firewall engine communicates with the firewall SVM 135 to gather all of the connection state data for the migrating GVM from the SVM (which is provided to the SVM by the connection state data storage 145, as illustrated in this example). After gathering this data, the firewall engine supplies this data to the VM migrator to transfer this data to the new host of the migrating GVM.

Figure 16:
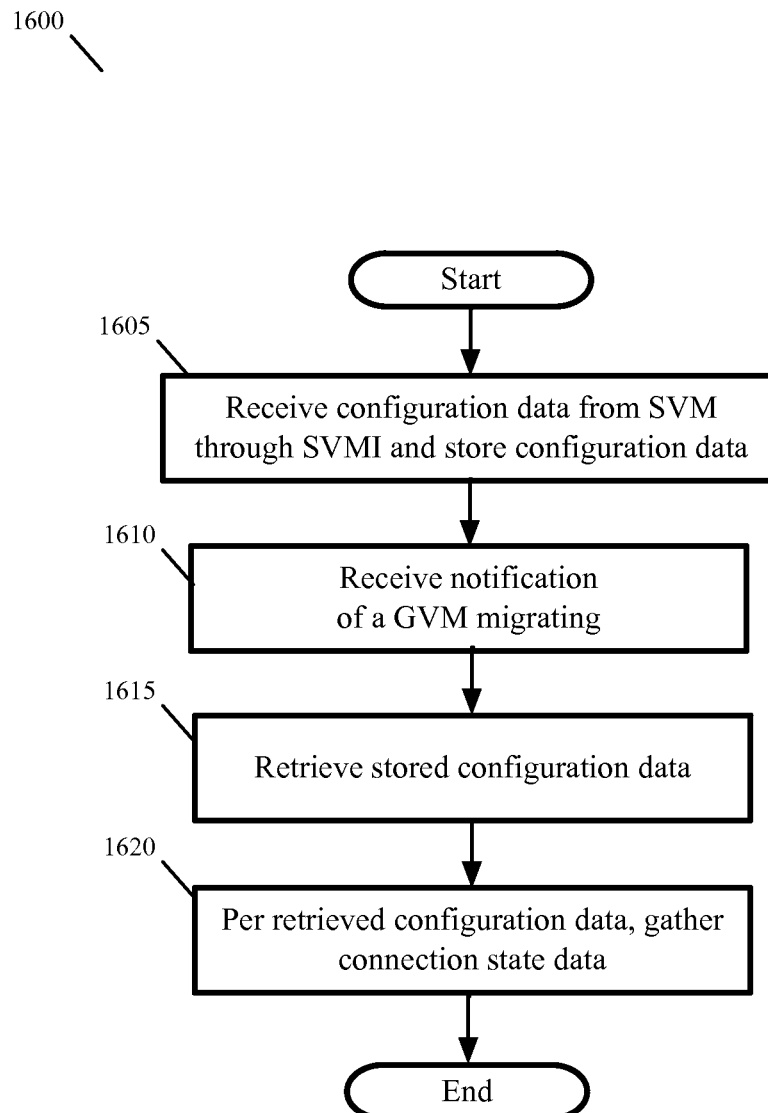
FIG. 16 presents a process for gathering connection state data based on the configuration defined by the SVM.

In some embodiments, the firewall engine 115 performs one of the approaches illustrated in FIGS. 13, 14 and 15 based on how it is configured by the firewall SVM 135 through the SVMI 130. FIG. 16 presents a process 1600 that illustrates this. This process is performed by the firewall engine 115. As shown, this process initially receives and stores (at 1605) configuration data that specifies the set of operations that the firewall engine has to perform to gather connection state data for a migrating GVM. The process receives the configuration data from the SVM through the SVMI. In some embodiments, the configuration data includes a set of values (e.g., one or more flag values) that specify whether the firewall engine needs to collect its local connection state data, to supply its local connection state data to the SVM, to request connection state data from the SVM, and/or to request review and possible update to the local connection state data by the SVM.

After 1605, the process receives (at 1610) a notification from the VM migrator that a GVM is migrating from the host to another host. Next, at 1615, the process retrieves the stored configuration data. Based on the stored configuration data, the process then performs (at 1620) one of the series of operations illustrated in FIG. 13, 14 or 15 to gather the connection state data for the migrating GVM. After 1620, the process ends.

Figure 17:
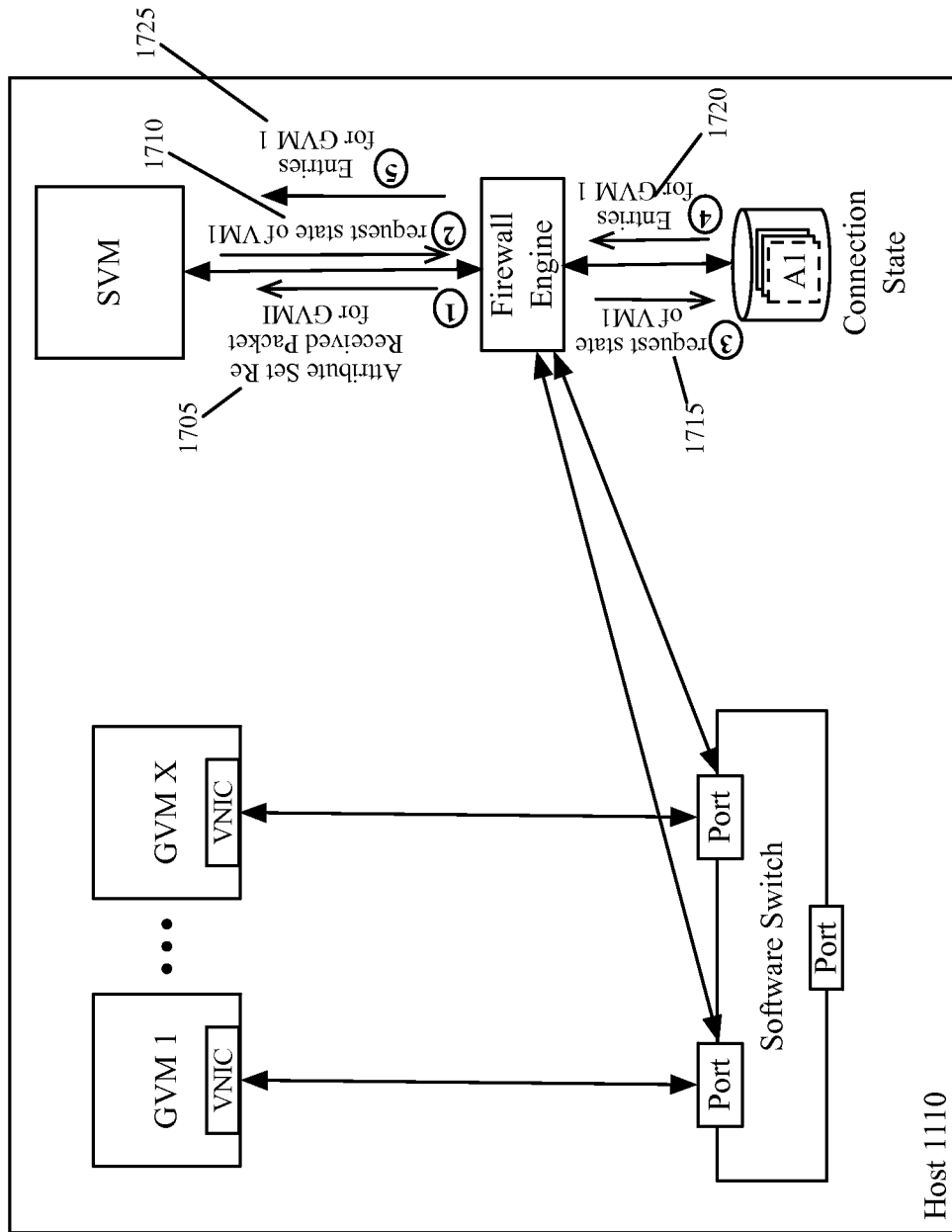
FIG. 17 presents a data flow diagram that illustrates the firewall SVM using the SVM interface to obtain connection state data from the firewall engine on a second host to which a GVM migrated from a first host.

As mentioned above, a firewall SVM 135 can also use the SVMI 130 to obtain connection state data from the firewall engine 115 on a second host to which a GVM migrated from a first host. FIG. 17 presents a data flow diagram that illustrates one such example. In this example, the host is host 1110 of FIG. 11 and the migrating GVM is GVM 1. As in FIG. 13, FIG. 17 does not illustrate the SVMI in order to simplify this drawing. However, the communication between the firewall engine 115 and the SVM 135 in this figure is done through the SVMI 130.

As shown in FIG. 17, the data flow starts with a communication 1705 from the firewall engine 115 to the firewall SVM 135. This communication is about a packet attribute set that the SVM should process, or the SVM should know that the firewall engine processed based on the data in the connection state data storage 125. This packet attribute set is a packet attribute set for which the connection state data storage 125 has an entry as this attribute set relates to a packet that was processed by the SVM 135 of the first host. This entry was moved to the connection state data storage 125 as part of the migration of GVM 1.

In some embodiments, the communication 1705 provides an indication that the attribute set is an attribute set for which the connection state data storage 125 has an entry. In other embodiments, the communication 1705 does not provide such an indication, because the SVM 135 is configured to check with the firewall engine for connection state data each time that the SVM receives an attribute set that it has not previously processed.

When the SVM 135 gets the communication 1705, the SVM determines that it does not have any information regarding this packet attribute state, either from the indication in the communication 1705, or by examining its connection state data storage 145, or through some other mechanism. In response to this determination, the SVM sends a request 1710 for connection state information for the received attribute set to the firewall engine 115 through the SVMI (not shown). In other words, the SVM 135 uses one of the APIs of the SVMI to ask the firewall engine 115 to obtain the cached connection state data for the received attribute set from its connection state data storage 125.

The firewall engine 115 then queries 1715 and retrieves 1720 the connection state data for the received attribute set from the connection state data storage, and provides this data as a reply 1725 to the API request 1710. The SVM then uses this data to perform its operation, which may be to store this data with the information that it received with the initial communication 1705 or to examine its firewall rules for the attribute set that it received with the initial communication 1705.

IV. Other Configuration of Firewall Engine Behavior

Through the SVMI APIs, the firewall SVM configures the rule-checking behavior of the firewall engine upon receiving a packet's attribute set. For instance, as mentioned above, the firewall SVM can configure the firewall engine to check with the firewall SVM (1) to identify the action to perform for all packet attribute sets, irrespective of whether the SVM examined the packet attribute sets before, (2) to identify the action to perform for a packet attribute set each Nth time that the firewall engine receives the packet attribute set, and/or (3) to relay information about a packet attribute set that the firewall engine processes by examining its connection state data storage 125.

The configured behaviors in some embodiments also include other behaviors. For instance, the SVM might configure the firewall engine with configuration rules that specify how the firewall engine should check a packet that is exchanged between source and destination GVMs that execute on the same host. Absent special configuration, such a packet would cause the firewall engine in some embodiments to check twice with the firewall SVM, once for the source GVM and once for the destination GVM. However, through the SVMI APIs of some embodiments, the firewall SVM can configure the firewall engine to have the firewall SVM perform a check for such a packet only once, either for the source GVM or for the destination GVM.

Figure 18:
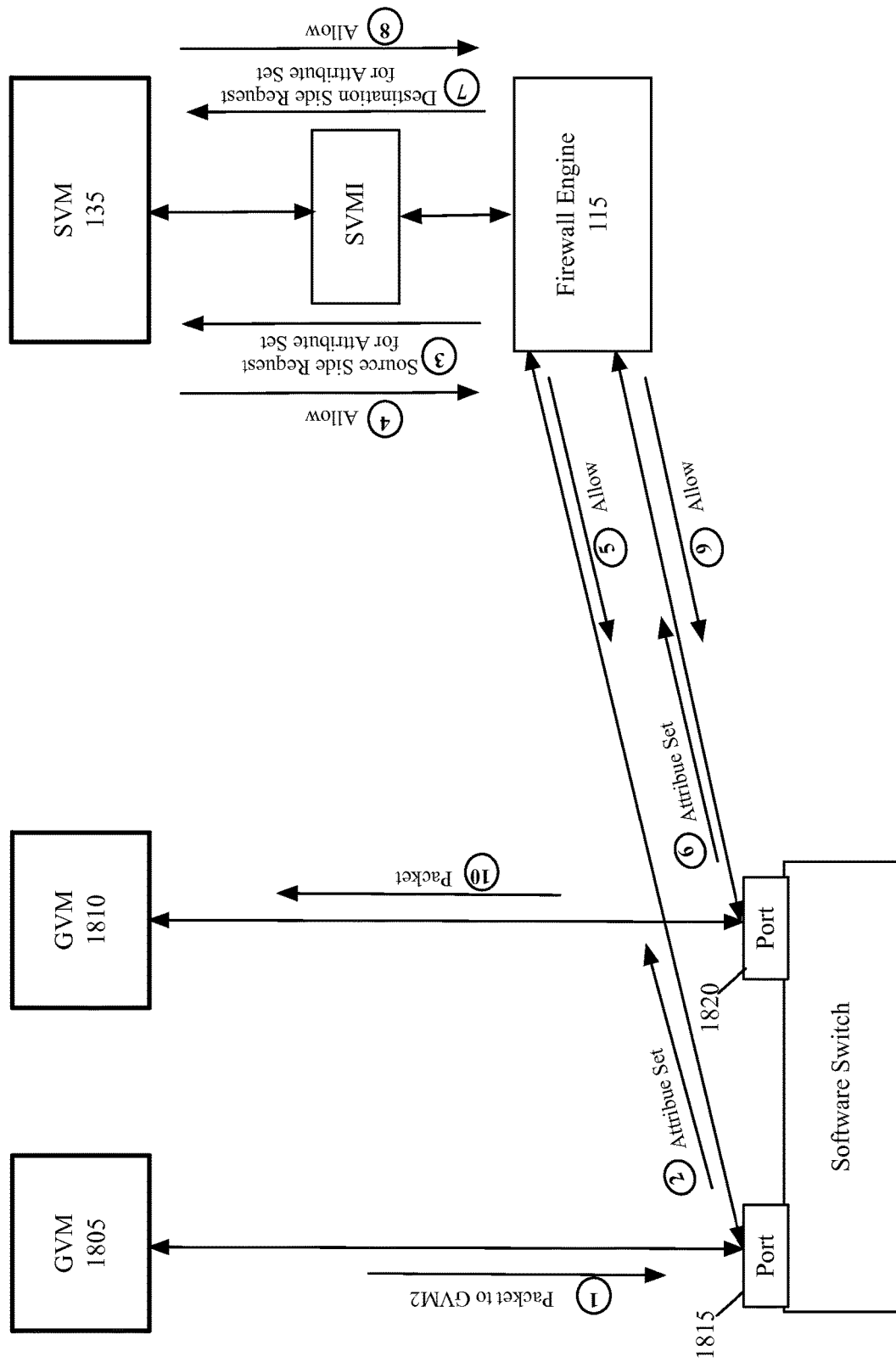
FIG. 18 illustrates a data flow diagram that shows the firewall engine checking with the firewall SVM twice for a packet that is exchanged between source and destination GVMs that execute on the same host.

FIG. 18 illustrates a data flow diagram that shows the firewall engine 115 checking with the firewall SVM 135 twice for a packet that is exchanged between source and destination GVMs that execute on the same host. In this figure, the firewall engine's interaction with the connection state data storage 125 is not show in order not to obscure the description of this figure with unnecessary detail. As shown in FIG. 18, the firewall engine 115 is called twice to process a packet sent from GVM 1805 to GVM 1810, a first time from the port 1815 (connected to GVM 1805) and a second time from the port 1820 (connected to GVM 1810). Each time that the firewall engine is called by a port, the engine exchanges messages with the SVM to direct the SVM to perform a firewall rule check on the packet received at the port. Having the SVM check the same packet twice is inefficient, especially since the packet never left the host on which the source and destination GVMs execute.

To avoid this inefficiency, the SVM can configure the firewall engine through the APIs of the SVMI to have the firewall SVM only perform a check once for a packet exchanged between source and destination GVMs on one host. This check can be performed only once for the source GVM or the destination GVM, as shown in FIGS. 19 and 20.

Figure 19:
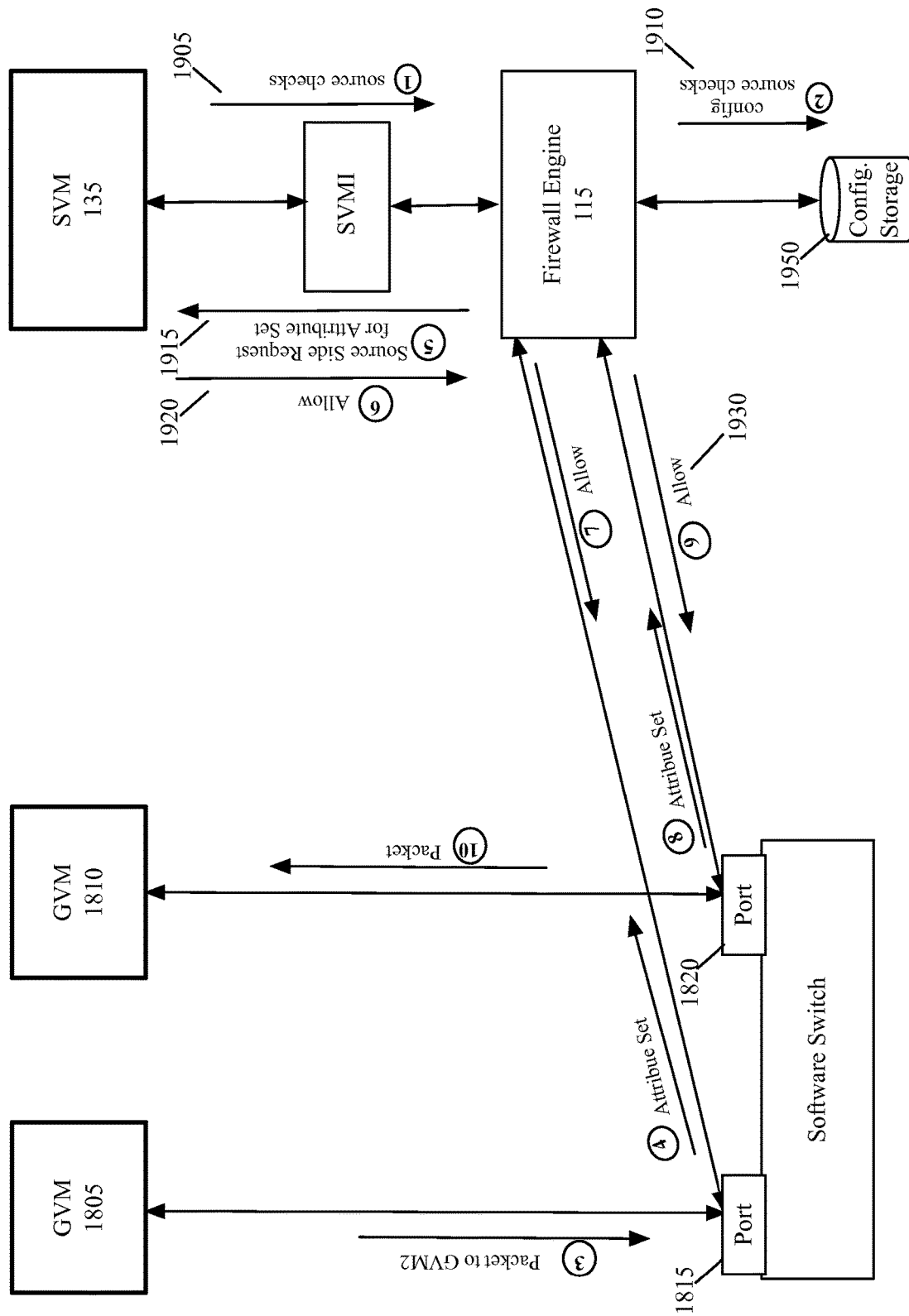
FIG. 19 illustrates a data flow diagram that shows the firewall engine checking with the firewall SVM only at the source side for a packet that is exchanged between source and destination GVMs that execute on the same host.
Figure 20:
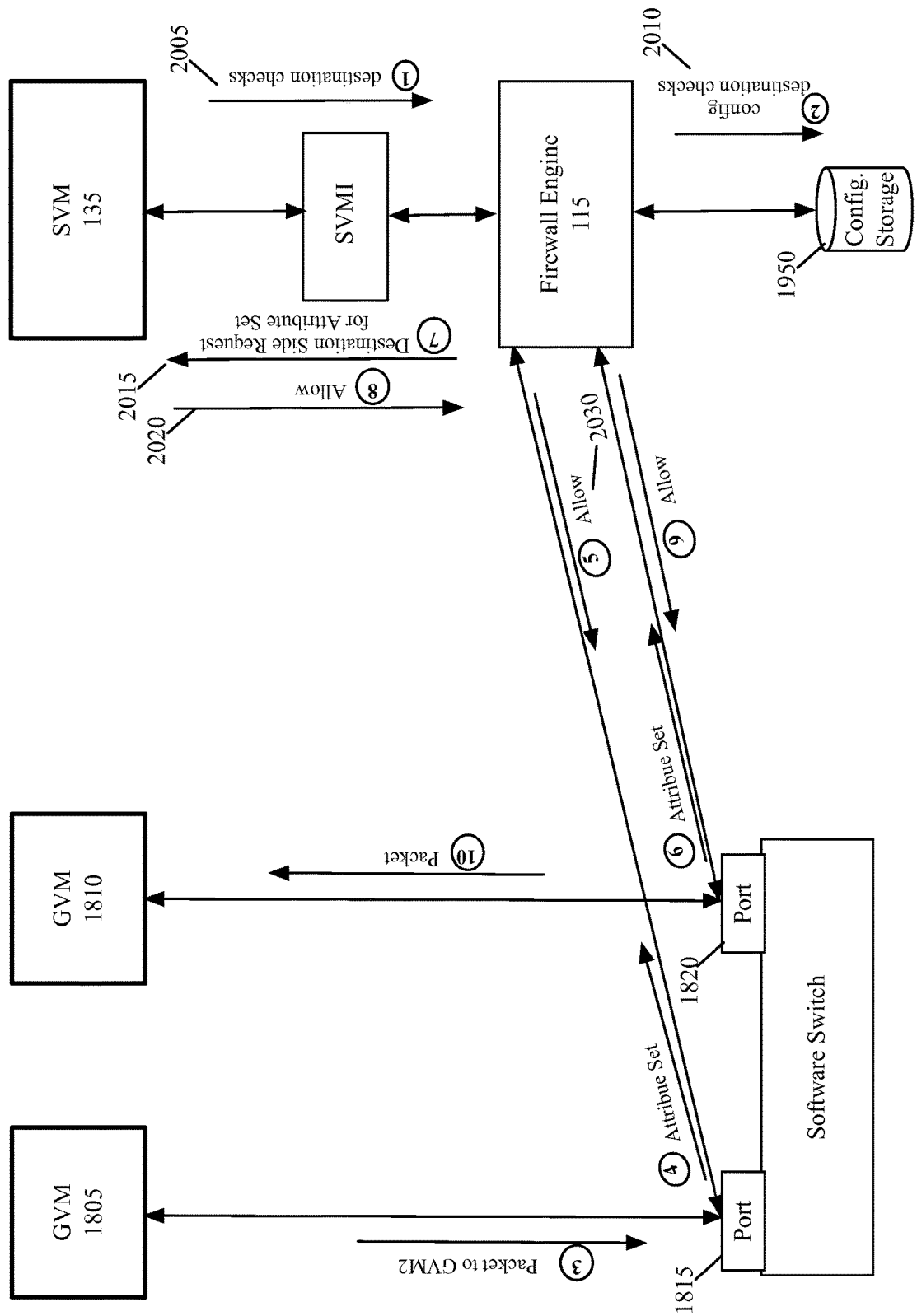
FIG. 20 illustrates a data flow diagram that shows the firewall engine checking with the firewall SVM only at the destination side for a packet that is exchanged between source and destination GVMs that execute on the same host.

FIG. 19 illustrates a data flow diagram that shows the firewall engine 115 checking with the firewall SVM 135 only at the source side for a packet that is exchanged between source and destination GVMs that execute on the same host. In this figure, the firewall engine's interaction with the connection state data storage 125 is not show in order not to obscure the description of this figure with unnecessary detail.

FIG. 19 is identical to FIG. 18 except in two regards. The first difference is that FIG. 19 shows that before the packet is sent by the source GVM 1805, the SVM 135 configures the firewall engine 115 (through the SVMI) to only check at the source port a packet that is exchanged between source and destination GVMs that execute on the same host. The SVM configures the firewall engine by providing it with a configuration value 1905 that specifies the source-port only check. The firewall engine stores this configuration in a configuration data storage 1950, as represented by storage command 1910 in FIG. 19.

The second difference is that FIG. 19 shows that the firewall engine 115 only checks with the SVM 135 when it gets the packet's attribute set from the source GVM's port 1815. This check is represented by messages 1915 and 1920 that are exchanged between the firewall engine 115 and the SVM 135. The fact that the firewall engine 115 does not have the SVM perform a destination-side check on the packet is also illustrated by the firewall engine replying with an Allow message 1930 when it receives the packet's attribute set from the destination GVM's port 1820. The firewall engine provides this reply without checking with the firewall SVM.

FIG. 20 illustrates a data flow diagram that shows the firewall engine 115 checking with the firewall SVM 135 only at the destination side for a packet that is exchanged between source and destination GVMs that execute on the same host. Again, in this figure, the firewall engine's interaction with the connection state data storage 125 is not show in order not to obscure the description of this figure with unnecessary detail.

FIG. 20 is identical to FIG. 18 except in two regards. The first difference is that FIG. 20 shows that before the packet is sent by the source GVM 1805, the SVM 135 configures the firewall engine 115 (through the SVMI) to only check at the destination port a packet that is exchanged between source and destination GVMs that execute on the same host. The SVM configures the firewall engine by providing it with a configuration value 2005 that specifies the destination-only check. The firewall engine stores this configuration in a configuration data storage 1950, as represented by storage command 2010 in FIG. 20.

The second difference is that FIG. 20 shows that the firewall engine 115 only checks with the SVM 135 when it gets the packet's attribute set from the destination GVM's port 1820. This check is represented by messages 2015 and 2020 that are exchanged between the firewall engine 115 and the SVM 135. The fact that the firewall engine 115 does not have the SVM perform a source-side check on the packet is also illustrated by the firewall engine replying with an Allow message 2030 when it receives the packet's attribute set from the source GVM's port 1815. The firewall engine provides this reply without checking with the firewall SVM.

The examples illustrated in FIGS. 19 and 20 show that the SVM's configuration of the firewall engine eliminating one redundant instance of the firewall engine checking with the SVM when a packet is exchanged between source and destination GVMs executing on the same host. Even when the firewall engine checks its connection state data storage 125 for the connection state of packet attribute sets that it has previously analyzed, the SVM's configuration of the firewall engine can also eliminate one of redundant checks of the connection state data storage 125, by allowing this engine to only check the data storage for the source-side or the destination-side GVM.

Figure 21:
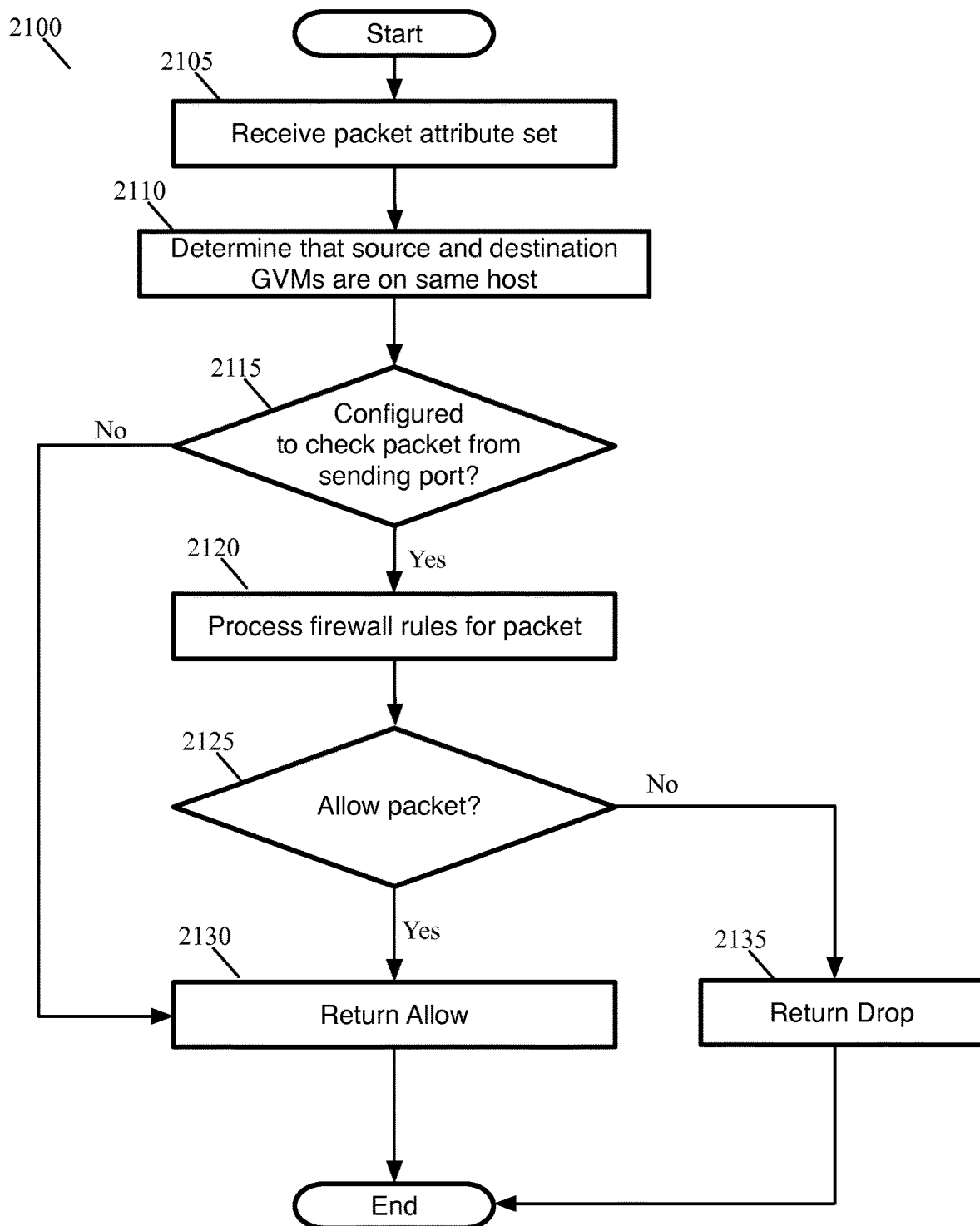
FIG. 21 conceptually illustrates a process that the firewall engine performs when it receives a packet that is exchanged between source and destination GVMs that execute on the same host.

FIG. 21 conceptually illustrates a process 2100 that the firewall engine 115 performs when it receives a packet that is exchanged between source and destination GVMs that execute on the same host. This process starts when the firewall engine receives (at 2105) a packet attribute set from either the source or destination GVM's port. Next, at 2110, the process determines that the source and destination GVMs of the received attribute set's packet are executing on the firewall engine's host.

At 2115, the process then determines whether it has been configured to perform firewall rule processing for such a packet on behalf of the port that provided the packet attribute set received at 2105. To do this, the process checks the configuration data storage 1950. If the process has not been configured to perform the firewall rule processing, the process returns (at 2130) an Allow to the port that provided the received packet attribute set and then ends.

On the other hand, when the process determines (at 2115) that is has been configured to perform firewall rule processing for packet attribute sets received from the port that sent the current packet attribute set for packets that are exchanged between source and destination GVMs on the same host, the process transitions from 2115 to 2120. At 2120, the process performs firewall rule processing for the received packet attribute set. In some embodiments, the processing of the firewall rules entails always forwarding any received packet attribute set to the firewall SVM. In other embodiments, the firewall engine can process the received packet attribute set based on the data in its connection state data storage 125, for some or all of the packet attributes sets that the firewall SVM 135 has previously processed in at least one previous iteration.

After processing the firewall rules at 2120, the process determines whether it should return a Drop or an Allow based on the matching firewall rule or matching connection state entry. When the matching record specifies a Drop, the process transitions to 2135 to return a Drop and then ends. Alternatively, when the matching record specifies an Allow, the process transitions to 2130 to return an Allow, and then ends.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
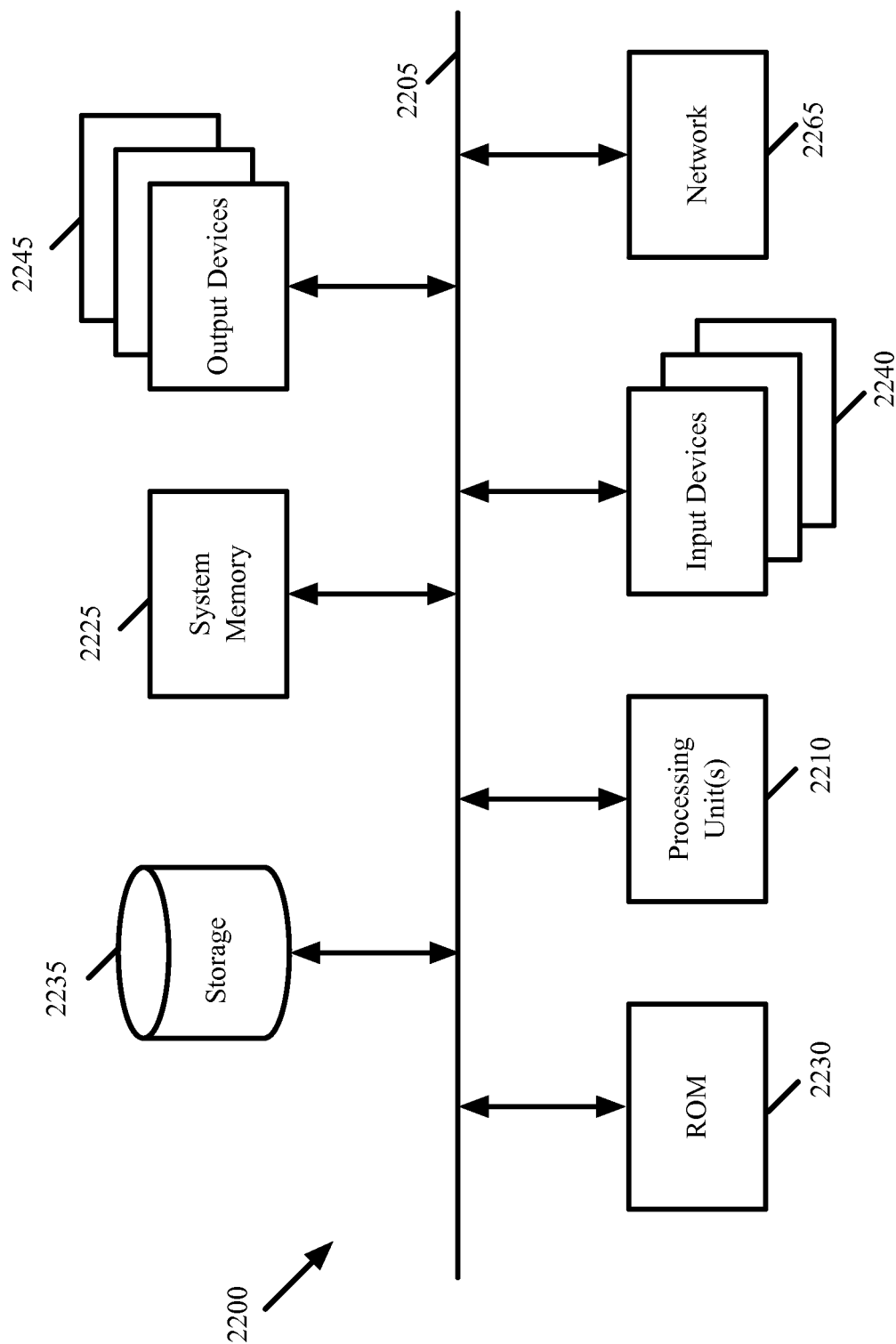
FIG. 22 conceptually illustrates an electronic system with which some embodiments of the invention are implemented.

FIG. 22 conceptually illustrates an electronic system 2200 with which some embodiments of the invention are implemented. The electronic system 2200 can be used to execute any of the control, virtualization, or operating system applications described above. The electronic system 2200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments. The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, in several of the above-described embodiments, the physical forwarding element is a software switch that executes on a host. In other embodiments, however, the physical forwarding element is a switch that operates in a network interface card (NIC) of the host.

Also, a number of the figures (e.g., FIGS. 7-9, 12, 16, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Several of the above-described embodiments involve firewall SVMs. However, as mentioned above, some of the apparatuses and methodologies of these embodiments are equally applicable to other SVMs that provide other services (such as load balancing, network address translations, etc.). In view of the foregoing, one of ordinary skill in the art would understand that the invention is not to be limited by the foregoing illustrative details, but rather is to be defined by the appended claims.

We claim:

1. A non-transitory machine readable medium storing a program for migrating firewall connection state data as a guest virtual machine (GVM) migrates from a first host computing device to a second host computing device, the program comprising sets of instructions for:
receiving configuration data from a firewall service virtual machine (SVM) regarding how to migrate connection state data that relates to firewall rule processing of the SVM for a migrating GVM;
receiving indication that the GVM is migrating from the first host to the second host;
gathering the connection state data relating to the firewall SVM's firewall rule processing for the GVM according to the configuration data received from the firewall SVM; and
transferring the gathered connection state data to the second host.

2. The machine readable medium of claim 1, wherein the program further comprises sets of instructions for:
sending, to the SVM, sets of attributes of packets for the GVMs for which the SVM has to process firewall rules;
receiving, from the SVM, actions to perform for the packets; and
storing, in a data storage, connection state data based on the received actions.

3. The machine readable medium of claim 2, wherein the set of instructions for gathering the connection state data comprises sets of instructions for:
gathering stored connection state data from the data storage;
forwarding the gathered, stored connection state data to the SVM for the SVM to review and possibly to update; and
from the SVM, receiving connection state data to transfer to the second host.

4. The machine readable medium of claim 3,
wherein the forwarding and receiving of the connection state data is through an SVM interface (SVMI); and
wherein the receiving of the configuration data is also through the SVMI.

5. The machine readable medium of claim 2, wherein the set of instructions for gathering the connection state data comprises a set of instructions for gathering stored connection state data from the connection data storage.

6. The machine readable medium of claim 1, wherein the set of instructions for gathering the connection state data comprises sets of instructions for:
sending the SVM a query for connection state data that is stored by the SVM for the migrating GVM; and
from the SVM, receiving connection state data to transfer to the second host.

7. The machine readable medium of claim 6,
wherein the sending of the query and the receiving of the connection state data is through an SVM interface (SVMI); and
wherein the receiving of the configuration data is also through the SVMI.

8. The machine readable medium of claim 1, wherein
the program further comprises sets of instructions for sending, to the SVM, sets of attributes of packets for the GVMs for which the SVM has to process firewall rules;
the connection state data comprises a plurality of entries, different entries correspond to different sets of packet attributes processed by the SVM; and
each entry including an action returned by the SVM for the entry's corresponding packet attribute set and an identifier derived from the packet attribute set.

9. The machine readable medium of claim 1, wherein once the connection state data has been transferred to the second host, an SVM on the second host retrieves the connection state data for a packet's attribute set when the second host's SVM encounters an attribute set that it has not previously received.

10. The machine readable medium of claim 1, wherein once the connection state data has been transferred to the second host, an SVM on the second host retrieves the connection state data for the migrated GVM after the second host's SVM receives a notification that the GVM has migrated to the second host.

11. The machine readable medium of claim 1, wherein once the connection state data has been transferred to the second host, an SVM on the second host retrieves the connection state data for a packet's attribute set when the second host's SVM receives information about a firewall rule check that has been resolved by reference to the transferred connection state data.

12. The machine readable medium of claim 1, wherein once the connection state data has been transferred to the second host, an SVM on the second host accesses the transferred connection state data, said transfer of the connection state data with the migrating GVM obviating the need for the SVMs on the first and second hosts from having to synchronize their respective connection state data.

13. A firewall rule processing apparatus for a host that executes a plurality of guest virtual machines (GVMs), the apparatus comprising:
a firewall service virtual machine (SVM) executing on the host for processing firewall rules;
a firewall process executing on the host for sending sets of attributes of GVM packets to the firewall SVM to process the firewall rules and for storing connection state data regarding the actions that the firewall SVM returns for each sent set of packet attributes; and
an SVM interface (SVMI) through which the SVM and firewall process communicate, and through which the SVM configures the firewall process to gather connection state data for a GVM that migrates from the host to another host.

14. The firewall rule processing apparatus of claim 13, wherein through the SVMI, the SVM configures the firewall process to follow a particular sequence of operations to gather firewall connection state data for the migrating GVM.

15. The firewall rule processing apparatus of claim 14 further comprising a configuration storage in which the firewall process stores configuration data received from the firewall SVM through the SVMI, the configuration data specifying the sequence of operations for the firewall process to follow.

16. The firewall rule processing apparatus of claim 14, wherein the sequence of operations comprises:
   gathering stored connection state data;
   forwarding the gathered, stored connection state data to the SVM for the SVM to review and possibly to update; and
   from the SVM, receiving connection state data to transfer to the second host.

17. The firewall rule processing apparatus of claim 14, wherein the sequence of operations comprises gathering stored connection state data.

18. The firewall rule processing apparatus of claim 14, wherein the sequence of operations comprises:
   sending the SVM a query for connection state data that is stored by the SVM for the migrating GVM; and
   from the SVM, receiving connection state data to transfer to the second host.

19. The firewall rule processing apparatus of claim 13, wherein the sets of packet attributes comprise source, destination, source port, and destination port data tuples.

20. A method of migrating firewall connection state data as a guest virtual machine (GVM) migrates from a first host computing device to a second host computing device, the first and second hosts executing respectively first and second firewall service virtual machines (SVMs), each SVM performing firewall rule processing for one or more of the GVMs executing on the SVM's host, the method comprising:
   receiving indication that a particular GVM is migrating from the first host to the second host;
   gathering connection state data relating to the first SVM's firewall rule processing for the particular GVM; and
   transferring the gathered connection state data to the second host, wherein the transferred, gathered connection state data allows the second SVM to process packets from the migrated particular GVM without losing the connection state data that the first SVM generated for the particular GVM before the GVM's migration.

21. The method of claim 20, wherein the transferred, gathered connection state data allows the second SVM to process packets from the migrated particular GVM based on the connection state data generated for the migrated particular GVM by the first SVM.

* * * * *